(12) United States Patent
Oh

(10) Patent No.: US 11,650,793 B2
(45) Date of Patent: May 16, 2023

(54) PROCESSING ELEMENT, NEURAL PROCESSING DEVICE INCLUDING SAME, AND METHOD FOR CALCULATING THEREOF

(71) Applicant: Rebellions Inc., Seongnam-si (KR)

(72) Inventor: Jinwook Oh, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 17/656,631

(22) Filed: Mar. 25, 2022

(65) Prior Publication Data

US 2022/0300794 A1 Sep. 22, 2022

Related U.S. Application Data

(63) Continuation of application No. 17/655,737, filed on Mar. 21, 2022.

(30) Foreign Application Priority Data

Mar. 22, 2021 (KR) .......................... 10-2021-0036503
Mar. 11, 2022 (KR) .......................... 10-2022-0030597

(51) Int. Cl.
    *G06F 7/544* (2006.01)
    *G06N 3/063* (2023.01)

(52) U.S. Cl.
    CPC .......... *G06F 7/5443* (2013.01); *G06N 3/063* (2013.01)

(58) Field of Classification Search
    CPC .......... G06F 7/5443; G06F 7/44; G06F 7/487; G06F 7/4876; G06F 7/523; G06F 7/52; G06F 7/57; G06F 7/483; G06F 17/16; G06F 7/499–49921; G06F 9/30025; H03M 7/00; H03M 7/24
See application file for complete search history.

(56) References Cited

U.S. PATENT DOCUMENTS

| | | | |
|---|---|---|---|
| 6,108,772 A * | 8/2000 | Sharangpani | G06F 7/483 712/E9.036 |
| 6,564,238 B1 * | 5/2003 | Kim | G06F 7/5443 708/490 |
| 2020/0073635 A1 * | 3/2020 | Madduri | G06F 9/30036 |
| 2020/0218508 A1 * | 7/2020 | DiCecco | G06F 7/485 |
| 2021/0072955 A1 * | 3/2021 | Mellempudi | G06N 3/063 |
| 2022/0066739 A1 * | 3/2022 | Croxford | G06K 9/6232 |

FOREIGN PATENT DOCUMENTS

KR 10-2019-0005043 A 1/2019

\* cited by examiner

*Primary Examiner* — Matthew D Sandifer
*Assistant Examiner* — Huy Duong
(74) *Attorney, Agent, or Firm* — Broadview IP Law, PC

(57) ABSTRACT

A processing element, a neural processing device including the same, and a method for calculating thereof are provided. The processing element includes a weight register configured to receive and store weights, an input activation register configured to store input activations, a flexible multiplier configured to receive the weight and the input activation, to perform a multiplication calculation in a first precision or a second precision different from the first precision according to a mode signal, occurrence of an overflow, and occurrence of an underflow, and to generates result data; and a saturating adder configured to receive the result data and generate subtotals.

20 Claims, 27 Drawing Sheets

PROCESSING ELEMENT, NEURAL PROCESSING DEVICE INCLUDING SAME, AND METHOD FOR CALCULATING THEREOF

CROSS-REFERENCE TO RELATED APPLICATIONS

This application is a continuation of U.S. application Ser. No. 17/655,737, filed on Mar. 21, 2022, which is based on and claims priority under 35 U.S.C. 119 to Korean Patent Application No. 10-2021-0036503 filed in the Korean Intellectual Property Office on Mar. 22, 2021, and Korean Patent Application No. 10-2022-0030597 filed in the Korean Intellectual Property Office on Mar. 11, 2022, the disclosure of which are herein incorporated by reference in its entirety.

FIELD OF THE DISCLOSURE

The present inventive concept relates to a processing element, a neural processing device including the same, and a method for calculating thereof. Specifically, the present inventive concept relates to a neural processing device that efficiently converts precision according to the occurrence of an overflow or underflow, and a pruning method thereof.

BACKGROUND

For the past few years, artificial intelligence technology has been the core technology of the Fourth Industrial Revolution and the subject of discussion as the most promising technology worldwide. The biggest issue with such artificial intelligence technology is computing performance. It is of utmost importance for artificial intelligence technology, which realizes human learning ability, reasoning ability, perceptual ability, natural language implementation ability, etc., to process a large amount of data quickly.

The central processing units (CPUs) or graphics processing unit (GPUs) of off-the-self computers were used for deep-learning training and inference in early artificial intelligence, but had limitations on the tasks of deep-learning training and inference with high workloads, and thus, neural processing units (NPUs) that are structurally specialized for deep learning tasks have received a lot of attention.

The neural processing unit can generally utilize data of a particular precision. The higher the number of bits of data, the more precisely the data can be represented, but more hardware resources may be required accordingly.

SUMMARY OF THE INVENTION

Technical Objects

It is an object of the present inventive concept to provide a processing element having improved accuracy through precision conversion at the time of data calculation.

It is another object of the present inventive concept to provide a neural processing device including a processing element having improved accuracy through precision conversion at the time of data calculation.

It is yet another object of the present inventive concept to provide a method for calculating of a neural processing device having improved accuracy through precision conversion at the time of data calculation.

The objects of the present inventive concept are not limited to those noted above, and other objects and advantages of the present inventive concept that have not been mentioned can be understood by the following description, and will be more clearly understood by embodiments of the present inventive concept. In addition, it will be readily appreciated that the objects and advantages of the present inventive concept can be realized by the means and combinations thereof set forth in the claims.

According to an aspect of the present inventive concept, there is provided a processing element comprising a weight register configured to receive and store weights, an input activation register configured to store input activations, a flexible multiplier configured to receive the weight and the input activation, to perform a multiplication calculation in a first precision or a second precision different from the first precision according to a mode signal, occurrence of an overflow, and occurrence of an underflow, and to generates result data; and a saturating adder configured to receive the result data and generate subtotals.

In some embodiments of the present inventive concept, the flexible multiplier comprises a detection unit configured to check whether an overflow or underflow occurs according to the multiplication calculation of the weight and the input activation and generate a detection result, a mode select logic configured to generate a mode selection signal by taking the detection result and the mode signal into account, a first multiplier configured to perform multiplication calculations in the first precision, a second multiplier configured to perform multiplication calculations in the second precision and a demultiplexer configured to receive the mode selection signal and select one of the first multiplier and the second multiplier to thereby transmit the weight and the input activation.

In some embodiments of the present inventive concept, the number of the first multipliers is k, and the number of the second multipliers is 2k.

In some embodiments of the present inventive concept, the first precision is 2N bits, and the second precision is N bits.

In some embodiments of the present inventive concept, the first precision is INT0, and the second precision is INT2.

In some embodiments of the present inventive concept, the flexible multiplier further comprises a multiplexer configured to receive a calculation result from the first multiplier or the second multiplier and generate a sign bit representing a sign and a product bit representing a magnitude.

In some embodiments of the present inventive concept, the result data comprise the sign bit and the product bit.

In some embodiments of the present inventive concept, the mode signal is one of a first mode signal for the first precision and a second mode signal for the second precision, the detection result comprises a first result in which the overflow or the underflow occurs and a second result in which the overflow or the underflow does not occur, and the mode selection signal is generated to be identical to the mode signal, if the mode selection logic receives the second result, and generated as the first mode signal regardless of the mode signal, if the mode selection logic receives the first result.

In some embodiments of the present inventive concept, the detection unit comprises a bit divider configured to divide the weight and the input activation into preset bit units, an overflow detector configured to generate the detection result and output the weight and the input activation in the second precision if the detection result is the second result and a converting module configured to receive the weight and the input activation, to convert them into the first precisions, and to output them, when the detection result is the first result.

According to another aspect of the present inventive concept, there is provided a neural processing device comprising at least one neural core, wherein the neural core comprises a processing unit configured to perform calculations and an L0 memory configured to store input and output data of the processing unit, wherein the processing unit comprises a PE array comprising at least one processing element, and wherein the PE array comprises a flexible multiplier configured to receive a weight and an input activation, to perform a multiplication calculation in a first precision or a second precision different from the first precision according to a mode signal, occurrence of an overflow, and occurrence of an underflow, and to generates result data and a saturating adder configured to receive the result data and generate subtotals.

In some embodiments of the present inventive concept, the weight and the input activation are represented in the second precision.

In some embodiments of the present inventive concept, the flexible multiplier converts the weight and the input activation into the first precisions, respectively, if an overflow or underflow occurs when a result of the multiplication calculation of the weight and the input activation is represented in the second precision.

In some embodiments of the present inventive concept, the flexible multiplier selects one of the first precision and the second precision according to the mode signal if the result of the multiplication calculation does not cause the overflow and the underflow, and performs a multiplication calculation.

In some embodiments of the present inventive concept, the neural processing device further comprises an L2 shared memory shared by the at least one neural core; and a local interconnection configured to transmit data between the L2 shared memory and the at least one neural core.

According to still another aspect of the present inventive concept, there is provided a method for calculating of a neural processing device, comprising determining whether a multiplication of a weight and an input activation causes an overflow or underflow, converting the weight and the input activation into a first precision if a mode signal selects the first precision or if the overflow or the underflow occurs, maintaining the weight and the input activation in a second precision if the mode signal selects the second precision and the overflow or the underflow does not occur, generating result data by multiplying the weight and the input activation, and generating a subtotal by accumulating the result data.

In some embodiments of the present inventive concept, the first precision uses twice as many bits as the second precision.

In some embodiments of the present inventive concept, the second precision is represented by symmetric quantization or asymmetric quantization.

In some embodiments of the present inventive concept, the second precision comprises a first bit representing a sign and a second bit representing a magnitude.

In some embodiments of the present inventive concept, the method further comprises dividing the weight and the input data before determining whether the overflow or the underflow occurs.

In some embodiments of the present inventive concept, the generating result data comprises generating the result data by selecting one of a first multiplier corresponding to the first precision and a second multiplier corresponding to the second precision.

Effects of the Invention

The processing element, the neural processing device including the same, and the method for calculating thereof of the present inventive concept can select a required precision according to a mode signal.

Furthermore, precision conversion can be performed to thereby increase accuracy when an overflow or underflow occurs in preference to a mode signal.

In addition to the foregoing, the specific effects of the present inventive concept will be described together while expounding the specific details for carrying out the invention below.

DETAILED DESCRIPTION OF THE PREFERRED EMBODIMENTS

Figure 1:
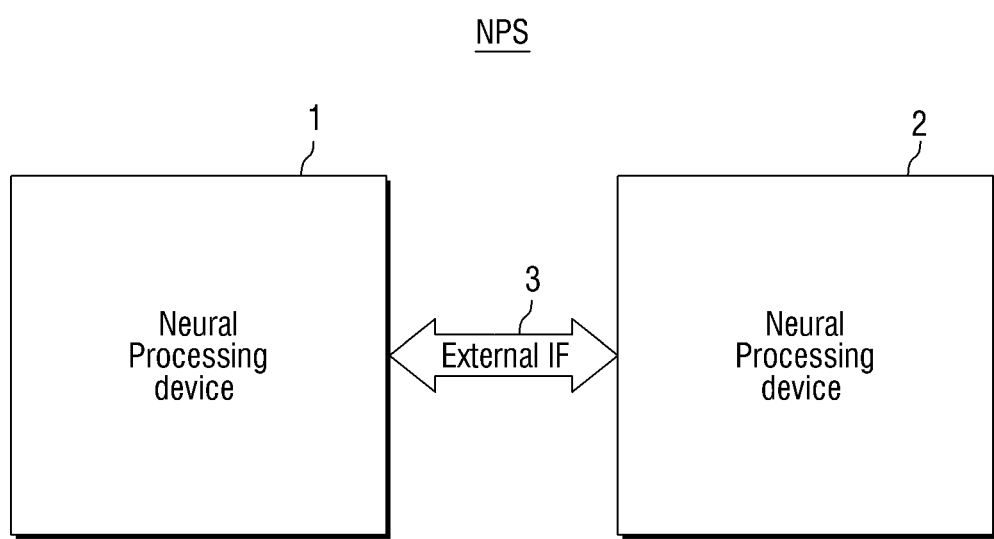
FIG. 1 is a block diagram for illustrating a neural processing system in accordance with some embodiments of the present inventive concept.

The present inventive concept will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, a neural processing device in accordance with some embodiments of the present inventive concept will be described with reference to FIGS. 1 to 28.

FIG. 1 is a block diagram for illustrating a neural processing system in accordance with some embodiments of the present inventive concept.

With reference to FIG. 1, a neural processing system NPS in accordance with some embodiments of the present inventive concept may include a first neural processing device 1, a second neural processing device 2, and an external interface 3.

The first neural processing device 1 may be a device that performs calculations using an artificial neural network. The first neural processing device 1 may be, for example, a device specialized in performing the task of deep learning calculations. However, the present embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments of the present inventive concept is not limited thereto. That is, in a neural processing system NPS in accordance with some embodiments of the present inventive concept, three or more neural processing devices may be connected to one another via the external interface 3. Also, conversely, a neural processing system NPS in accordance with some embodiments of the present inventive concept may include only one neural processing device.

Figure 2:
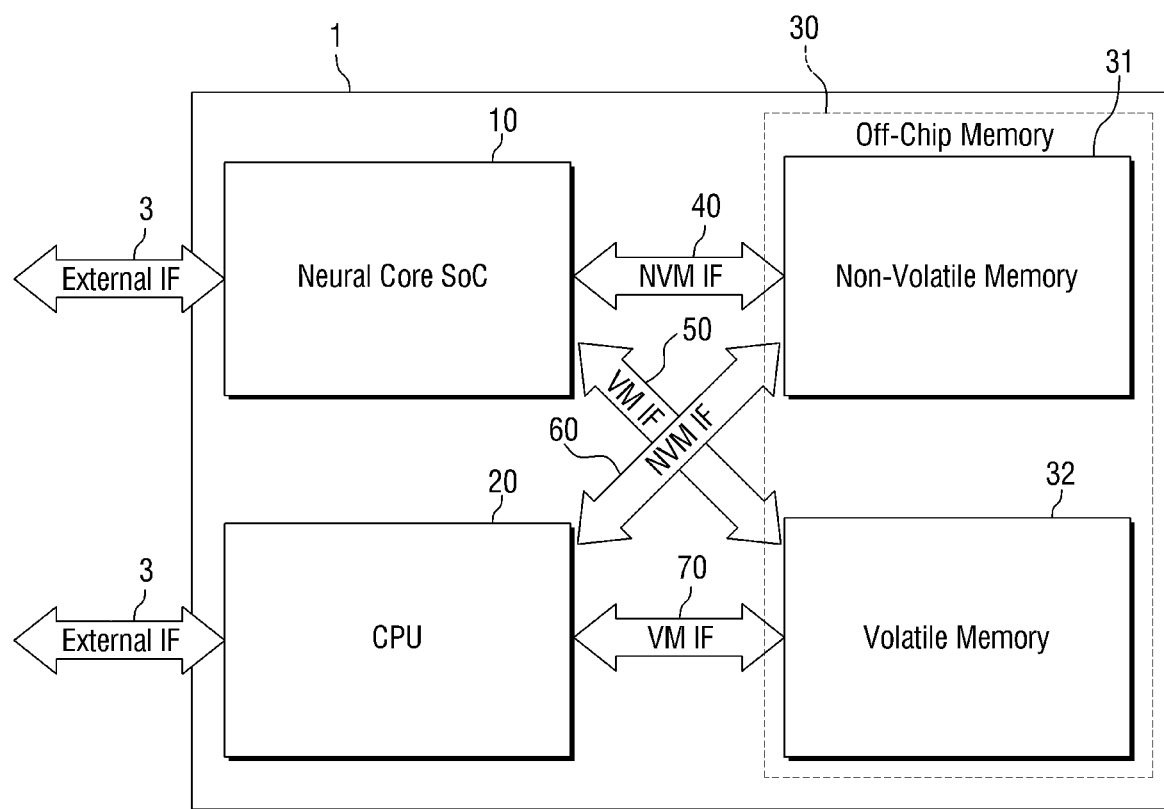
FIG. 2 is a block diagram for illustrating in detail the neural processing device of FIG. 1.

FIG. 2 is a block diagram for illustrating in detail the neural processing device of FIG. 1.

With reference to FIG. 2, the first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 is an artificial intelligence calculation unit, which may be an accelerator. The neural core SoC 10 may be, for example, any one of a graphics processing unit (GPU), a field-programmable gate array (FPGA), and an application-specific integrated circuit (ASIC). However, the present embodiment is not limited thereto.

The neural core SoC 10 may exchange data with other external calculation units via the external interface 3. In addition, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation unit and may have low efficiency in performing simple parallel calculations that are used a lot in deep learning. Therefore, there can be high efficiency by performing calculations in deep learning inference and training tasks by the neural core SoC 10.

The CPU 20 may exchange data with other external calculation units via the external interface 3. Moreover, the CPU 20 may be connected to the non-volatile memory 31 and the volatile memory 32 via the second non-volatile memory interface 60 and the second volatile memory interface 70, respectively.

The off-chip memory 30 may be a memory placed outside the chip of the neural core SoC 10. The off-chip memory 30 may include the non-volatile memory 31 and the volatile memory 32.

The non-volatile memory 31 may be a memory that continuously retains stored information even when electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, and 3D XPoint memory. However, the present embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), and Double Data Rate SDRAM (DDR SDRAM). However, the present embodiment is not limited thereto.

The first non-volatile memory interface 40 and the second non-volatile memory interface 60 may each include, for example, at least one of Parallel Advanced Technology Attachment (PATA), Small Computer System Interface (SCSI), Serial Attached SCSI (SAS), Serial Advanced Technology Attachment (SATA), and PCI Express (PCIe). However, the present embodiment is not limited thereto.

The first volatile memory interface 50 and the second volatile memory interface 70 may each be, for example, at least one of SDR (Single Data Rate), DDR (Double Data Rate), QDR (Quad Data Rate), and XDR (eXtreme Data Rate, Octal Data Rate). However, the present embodiment is not limited thereto.

Figure 3:
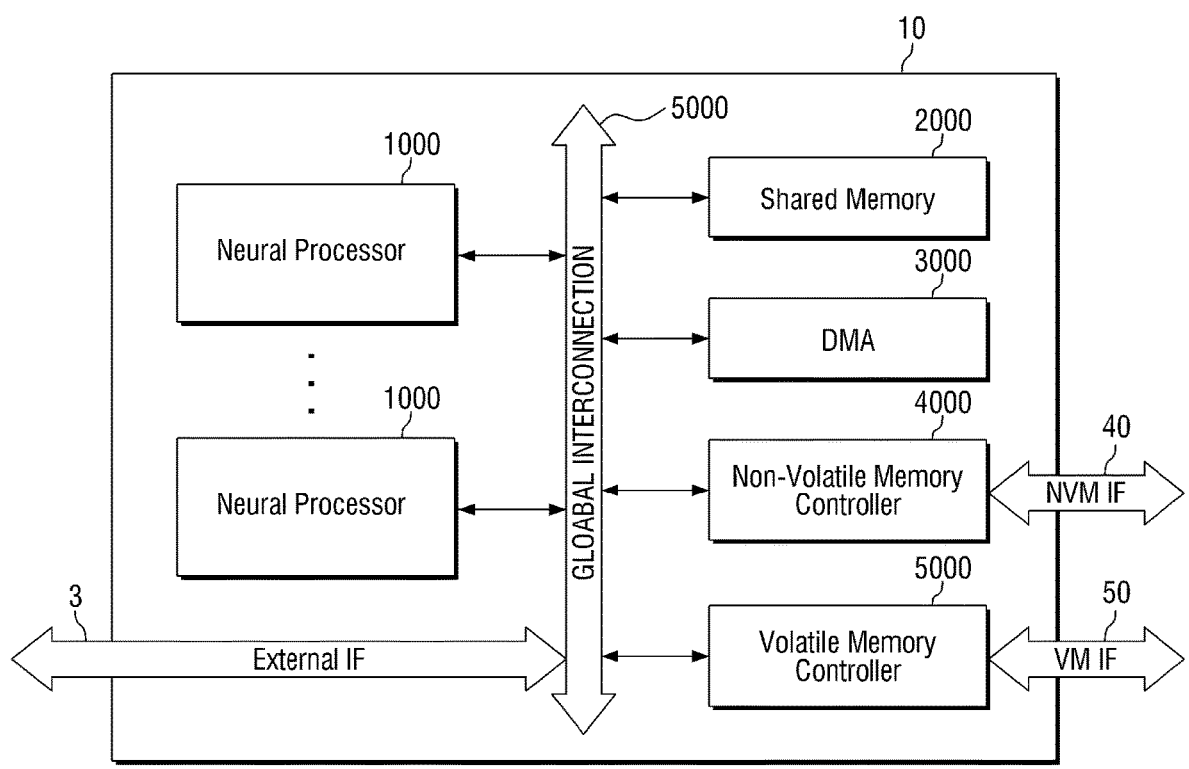
FIG. 3 is a block diagram for illustrating in detail the neural core SoC of FIG. 2.

FIG. 3 is a block diagram for illustrating in detail the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 5000.

The neural processor 1000 may be a calculation unit that directly performs calculation tasks. If there exist neural processors 1000 in plurality, calculation tasks may be assigned to respective neural processors 1000. The respective neural processors 1000 may be connected to each other via the global interconnection 5000.

The shared memory 2000 may be a memory shared by multiple neural processors 1000. The shared memory 2000 may store data of each neural processor 1000. Further, the shared memory 2000 may receive data from the off-chip memory 30, store them temporarily, and transfer them to each neural processor 1000. On the contrary, the shared memory 2000 may also receive data from the neural processor 1000, store them temporarily, and transmit them to the off-chip memory 30 of FIG. 2.

The shared memory 2000 may need a relatively high-speed memory. Accordingly, the shared memory 2000 may include, for example, an SRAM. However, the present embodiment is not limited thereto. That is, the shared memory 2000 may include a DRAM as well.

The shared memory 2000 may be a memory corresponding to the SoC level, i.e., level 3 (L3). Therefore, the shared memory 2000 may also be defined as an L3 shared memory.

The DMA 3000 may directly control the movement of data without the need for the neural processor 1000 to control the input and output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Moreover, the volatile memory controller 5000 may perform a refresh task of the volatile memory 32. The volatile memory controller 5000 may control the non-volatile memory 31 via the first volatile memory interface 50.

The global interconnection 5000 may connect the at least one neural processor 1000, the shared memory 2000, the DMA 3000, the non-volatile memory controller 4000, and the volatile memory controller 5000 to one another. In addition, the external interface 3 may also be connected to the global interconnection 5000. The global interconnection 5000 may be a path through which data travels between the at least one neural processor 1000, the shared memory 2000, the DMA 3000, the non-volatile memory controller 4000, the volatile memory controller 5000, and the external interface 3.

The global interconnection 5000 may transmit not only data but also control signals and may transmit a signal for synchronization. That is, in the neural processing device in accordance with some embodiments of the present inventive concept, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in prior art techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Accordingly, the latency resulting from each request and instruction can greatly reduce the efficiency of tasks.

Accordingly, in the neural processing device in accordance with some embodiments of the present inventive concept, each neural processor 1000, instead of the control processor, may directly transmit a synchronization signal to another neural processor 1000 according to the dependency of a task. In this case, multiple neural processors 1000 can perform the synchronization tasks in parallel as compared with the method managed by the control processor, thereby minimizing the latency due to synchronization.

Furthermore, the control processor needs to perform the task scheduling of the neural processors 1000 according to a task dependency, and the overhead of such scheduling may also increase significantly as the number of neural processors 1000 increases. Therefore, in the neural processing device in accordance with some embodiments of the present inventive concept, the scheduling task is also performed by the individual neural processors 1000, and thus, the performance of the device can be improved without even a scheduling burden resulting therefrom.

Figure 4:
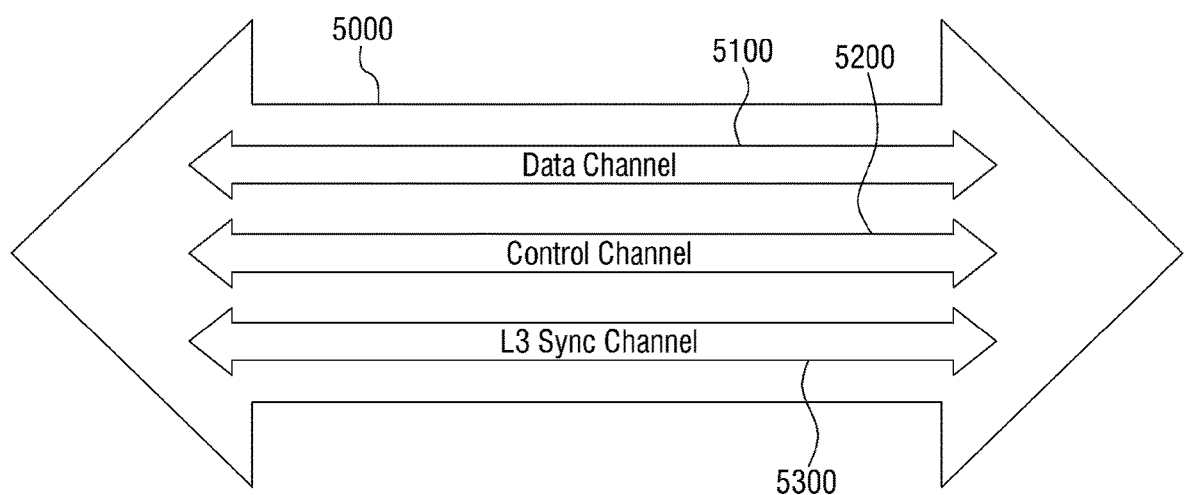
FIG. 4 is a structural diagram for illustrating in detail the global interconnection of FIG. 3.

FIG. 4 is a structural diagram for illustrating in detail the global interconnection of FIG. 3.

Referring to FIG. 4, the global interconnection 5000 may include a data channel 5100, a control channel 5200, and an L3 sync channel 5300.

The data channel 5100 may be a dedicated channel for transmitting data. Through the data channel 5100, the at least one neural processor 1000, the shared memory 2000, the DMA 3000, the non-volatile memory controller 4000, the volatile memory controller 5000, and the external interface 3 may exchange data with one another.

The control channel 5200 may be a dedicated channel for transmitting control signals. Through the control channel 5200, the at least one neural processor 1000, the shared memory 2000, the DMA 3000, the non-volatile memory controller 4000, the volatile memory controller 5000, and the external interface 3 may exchange control signals with one another.

The L3 sync channel 5300 may be a dedicated channel for transmitting synchronization signals. Through the L3 sync channel 5300, the at least one neural processor 1000, the shared memory 2000, the DMA 3000, the non-volatile memory controller 4000, the volatile memory controller 5000, and the external interface 3 may exchange synchronization signals with one another.

The L3 sync channel 5300 may be set as a dedicated channel inside the global interconnection 5000, and thus, may not overlap with other channels and transmit synchronization signals quickly. Accordingly, the neural processing device in accordance with some embodiments of the present inventive concept does not require new wiring work and may smoothly perform the synchronization task by utilizing the conventionally used global interconnection 5000.

Figure 5:
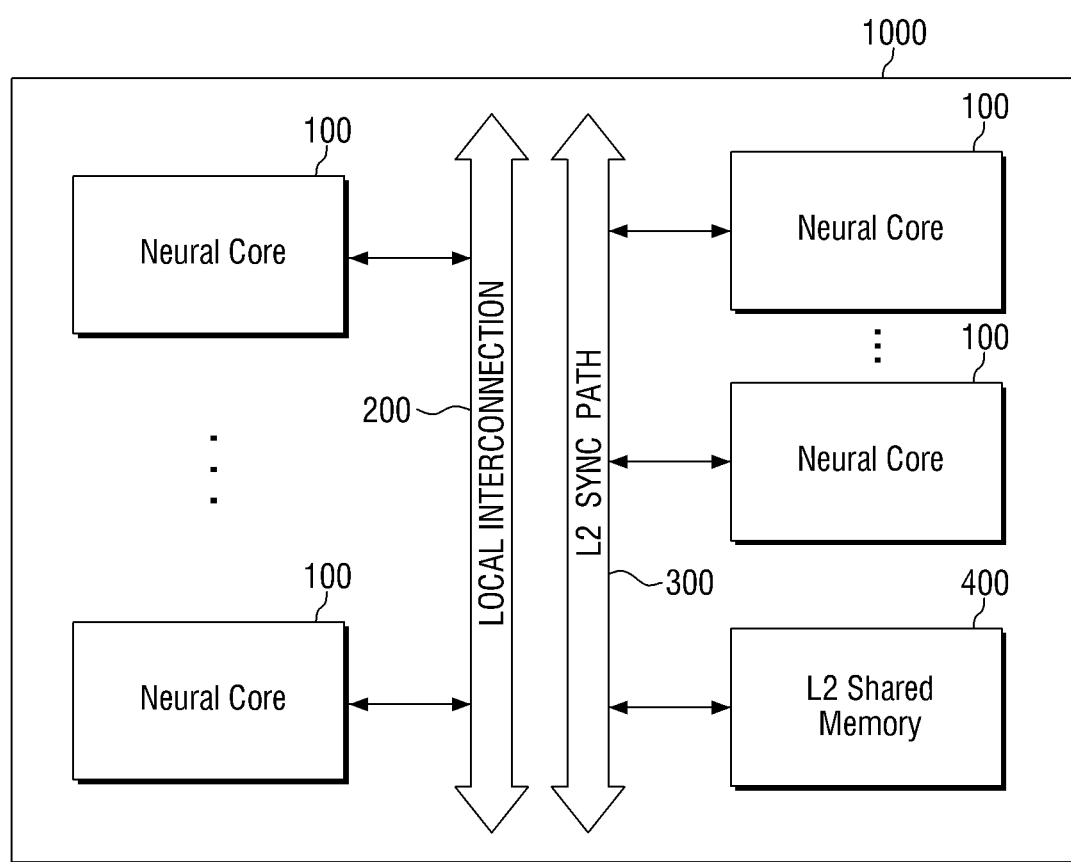
FIG. 5 is a block diagram for illustrating in detail the neural processor of FIG. 3.

FIG. 5 is a block diagram for illustrating in detail the neural processor of FIG. 3.

Referring to FIG. 3 to FIG. 5, the neural processor 1000 may include at least one neural core 100, an L2 shared memory 400, a local interconnection 200, and an L2 sync path 300.

The at least one neural core 100 may share and perform the tasks of the neural processor 1000. The number of neural cores 100 may be, for example, eight. However, the present embodiment is not limited thereto. FIG. 3 and FIG. 5 illustrate that a plurality of neural cores 100 are included in the neural processor 1000, but the present embodiment is not limited thereto. That is, the neural processor 1000 may be configured with only one neural core 100.

The L2 shared memory 400 may be a memory shared by the respective neural cores 100 in the neural processor 1000. The L2 shared memory 400 may store data of each neural core 100. In addition, the L2 shared memory 400 may receive data from the shared memory 2000 of FIG. 4, store them temporarily, and transmit them to each neural core 100. On the contrary, the L2 shared memory 400 may also receive data from the neural core 100, store them temporarily, and transfer them to the shared memory 2000 of FIG. 3.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 5000 of FIG. 3.

The L2 sync path 300 may connect the at least one neural core 100 and the L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. In the case of the local interconnection 200, sufficient channels may not be formed therein, unlike the global interconnection 5000. In such a case, the L2 sync path 300 may be formed separately so that the synchronization signal can be transmitted quickly and without any delay. The L2 sync path 300 may be used for synchronization performed at a level one step lower than that of the L3 sync channel 5300 of the global interconnection 5000.

Figure 6:
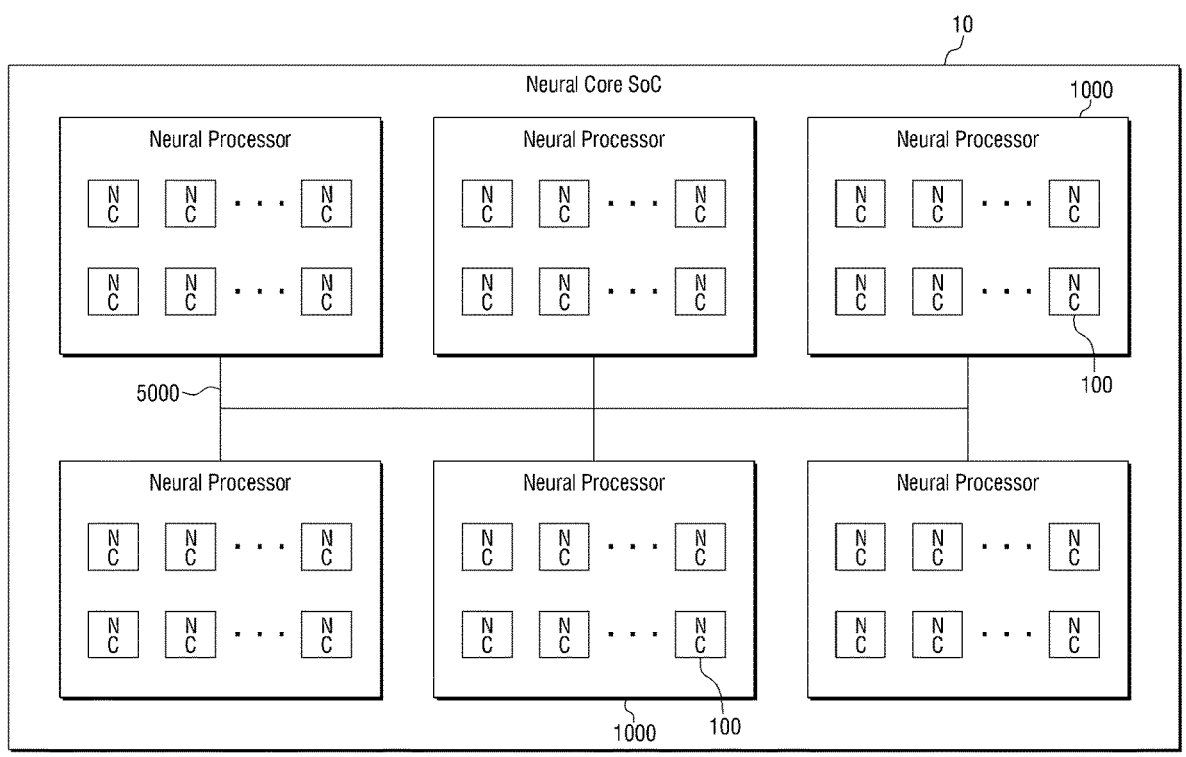
FIG. 6 is a diagram for illustrating a hierarchical structure of a neural processing device in accordance with some embodiments of the present inventive concept.

FIG. 6 is a diagram for illustrating a hierarchical structure of a neural processing device in accordance with some embodiments of the present inventive concept.

Referring to FIG. 6, the neural core SoC 10 may include at least one neural processor 1000. Each neural processor 1000 may transmit data to each other via the global interconnection 5000.

The neural processors 1000 may each include at least one neural core 100. The neural core 100 may be a processing unit optimized for deep learning calculation tasks. The neural core 100 may be a processing unit corresponding to one operation of a deep learning calculation task. In other words, a deep learning calculation task can be represented by a sequential or parallel combination of multiple operations. The neural cores 100 may each be a processing unit capable of processing one operation, and may be a minimum calculation unit that can be considered for scheduling from the viewpoint of a compiler.

The neural processing device in accordance with the present embodiment may configure the scales of the minimum calculation unit considered from the viewpoint of compiler scheduling and the hardware processing unit to be the same, so that fast and efficient scheduling and calculation tasks can be performed.

That is, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time, since scheduling inefficiency may occur and hardware design cost may increase.

Therefore, in the present embodiment, by adjusting the scales of the scheduling unit of the compiler and the hardware processing unit to be similar, it is possible to simultaneously satisfy the fast scheduling of calculation tasks and the efficient execution of the calculation tasks without wasting hardware resources.

Figure 7:
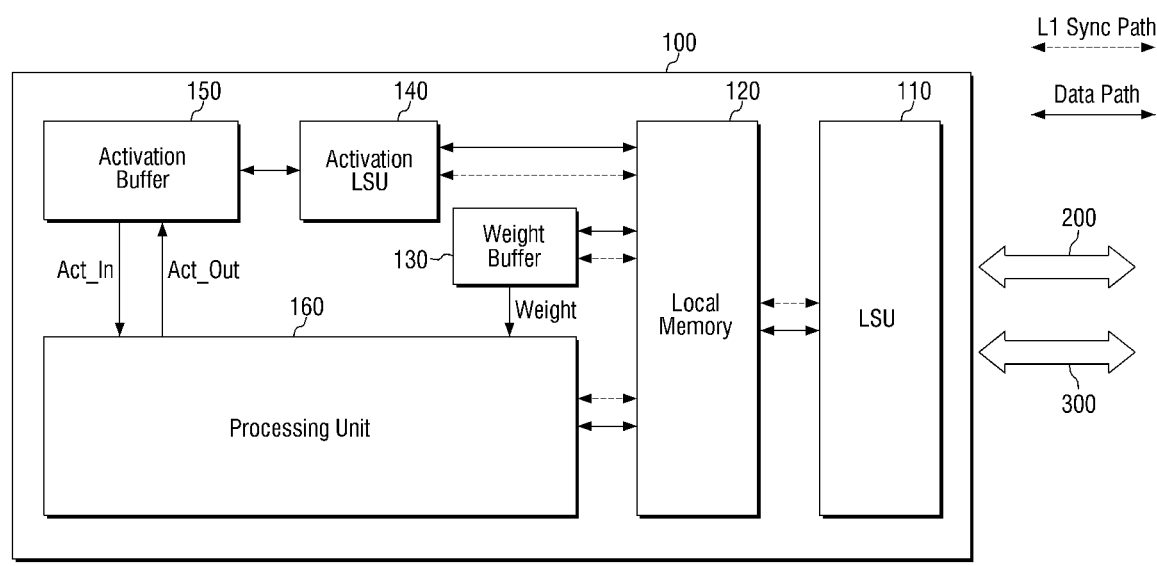
FIG. 7 is a block diagram for illustrating in detail the neural core of FIG. 5.

FIG. 7 is a block diagram for illustrating in detail the neural core of FIG. 5.

Referring to FIG. 7, the neural core 100 may include a load/store unit (LSU) 110, an L0 memory 120, a first weight manipulator 130, an activation LSU 140, an activation buffer 150, and a processing unit 160.

The LSU 110 may receive at least one of data, a control signal, and a synchronization signal from the outside via the local interconnection 200 and the L2 sync path 300. The LSU 110 may transmit at least one of the data, the control signal, and the synchronization signal received to the L0 memory 120. Similarly, the LSU 110 may transfer at least one of the data, the control signal, and the synchronization signal to the outside via the local interconnection 200 and the L2 sync path 300.

Figure 8:
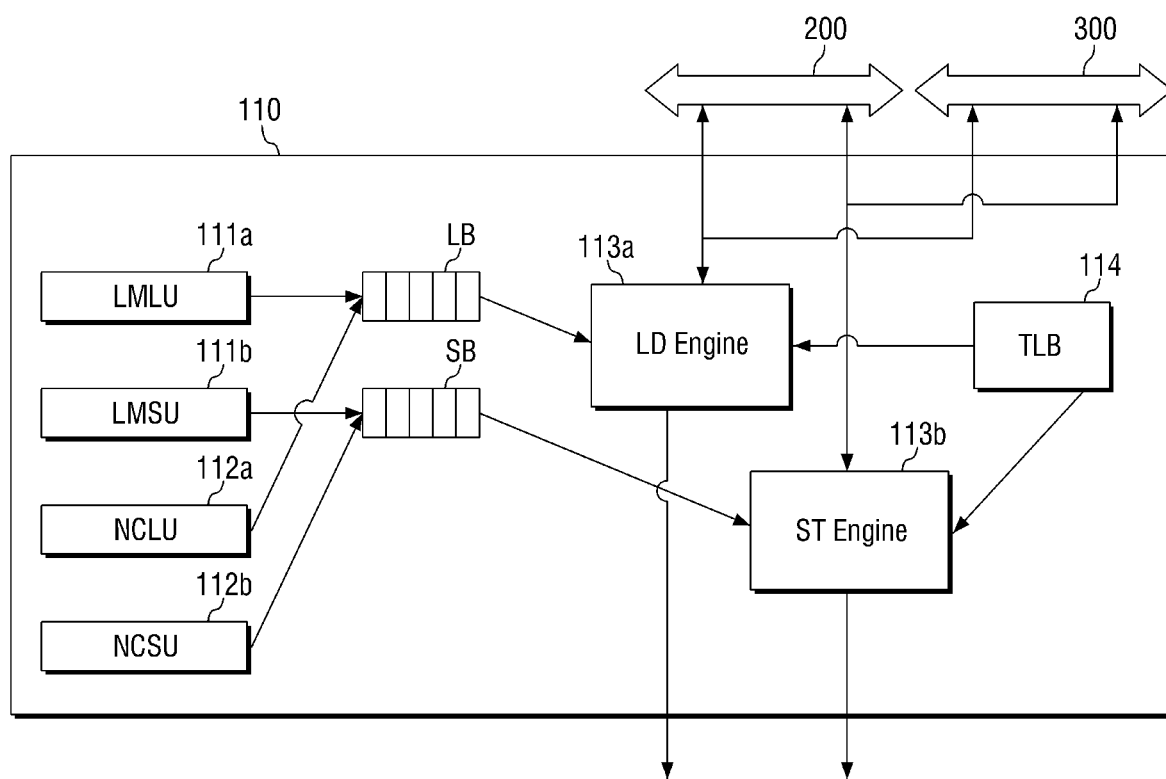
FIG. 8 is a block diagram for illustrating in detail the LSU of FIG. 7.

FIG. 8 is a block diagram for illustrating in detail the LSU of FIG. 7.

Referring to FIG. 8, the LSU 110 may include a local memory load unit 111a, a local memory store unit 111b, a neural core load unit 112a, a neural core store unit 112b, a load buffer LB, a store buffer SB, a load engine 113a, a store engine 113b, and a translation lookaside buffer 114.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

Also, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L2 sync path 300. At this time, the synchronization signals may have a meaning that the task has been completed.

Referring to FIG. 7 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a PE array 163 and a vector unit 164.

The L0 memory 120 may be a memory corresponding to the neural core level. The L1 memory may not be shared but be a private memory of the neural core, unlike the L2 shared memory 400 and the shared memory 2000.

The L0 memory 120 may transmit data such as activations or weights via a data path. The L0 memory 120 may exchange synchronization signals via an L1 sync path, which is a separate dedicated path. The L0 memory 120 may exchange synchronization signals with, for example, the LSU 110, the first weight manipulator 130, the activation LSU 140, and the processing unit 160 via the L1 sync path.

The weight buffer 130 may receive a weight from the L0 memory 120. The weight buffer 130 may transmit the weight to the processing unit 160. The weight buffer 130 may temporarily store the weight before transmitting it.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training stage, and may be used to derive the output activation Act_Out via a fixed value in the inference stage.

The activation LSU 140 may transmit the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large amount of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 9:
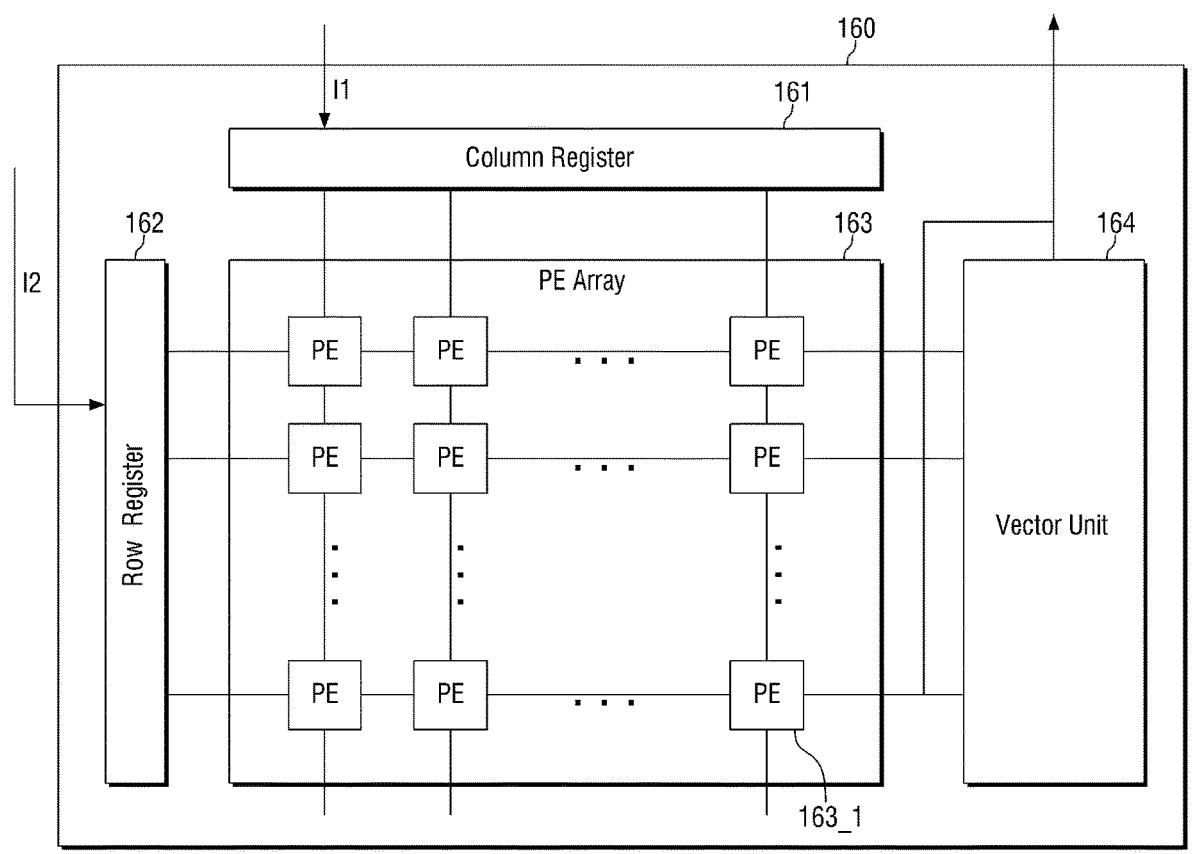
FIG. 9 is a block diagram for illustrating in detail the processing unit of FIG. 7.

FIG. 9 is a block diagram for illustrating in detail the processing unit of FIG. 7.

With reference to FIGS. 7 and 9, the processing unit 160 may include a PE array 163, a vector unit 164, a column register 161, and a row register 162.

The PE array 163 may receive the input activation Act_In and the weight and perform multiplication on them. In this case, the input activation Act_In and the weight may each be in the form of matrices and calculated via convolution. Through this, the PE array 163 may generate an output activation Act_Out. However, the present embodiment is not limited thereto. The PE array 163 may generate any number of different types of outputs other than the output activation Act_Out as well.

The PE array 163 may include at least one processing element 163_1. The processing elements 163_1 may be aligned with each other and may each perform multiplication on one input activation Act_In and one weight.

The PE array 163 may generate a subtotal obtained by summing values for each multiplication. This subtotal may be utilized as an output activation Act_Out. The PE array 163 performs two-dimensional matrix multiplications, and thus, may be referred to as a 2D matrix compute unit.

The vector unit 164 may perform one-dimensional calculations. The vector unit 164, together with the PE array 163, may perform deep learning calculations. Through this, the processing unit 160 may be specialized for necessary calculations. In other words, the neural core 100 has calculation modules, respectively, that perform a large amount of two-dimensional matrix calculations and one-dimensional calculations, and thus, can efficiently perform deep learning tasks.

The column register 161 may receive a first input I1. The column register 161 may receive the first input I1, divide it, and provide them to each column of the processing element PE.

The row register 162 may receive a second input I2. The row register 162 may receive the second input I2, divide it, and provide them to each row of the processing element PE.

The first input I1 may be the input activation Act_In or the weight. The second input I2 may be a value, which is not the first input I1, out of the input activation Act_In or the weight. Alternatively, the first input I1 and the second input I2 may be values other than the input activation Act_In and the weight.

Figure 10:
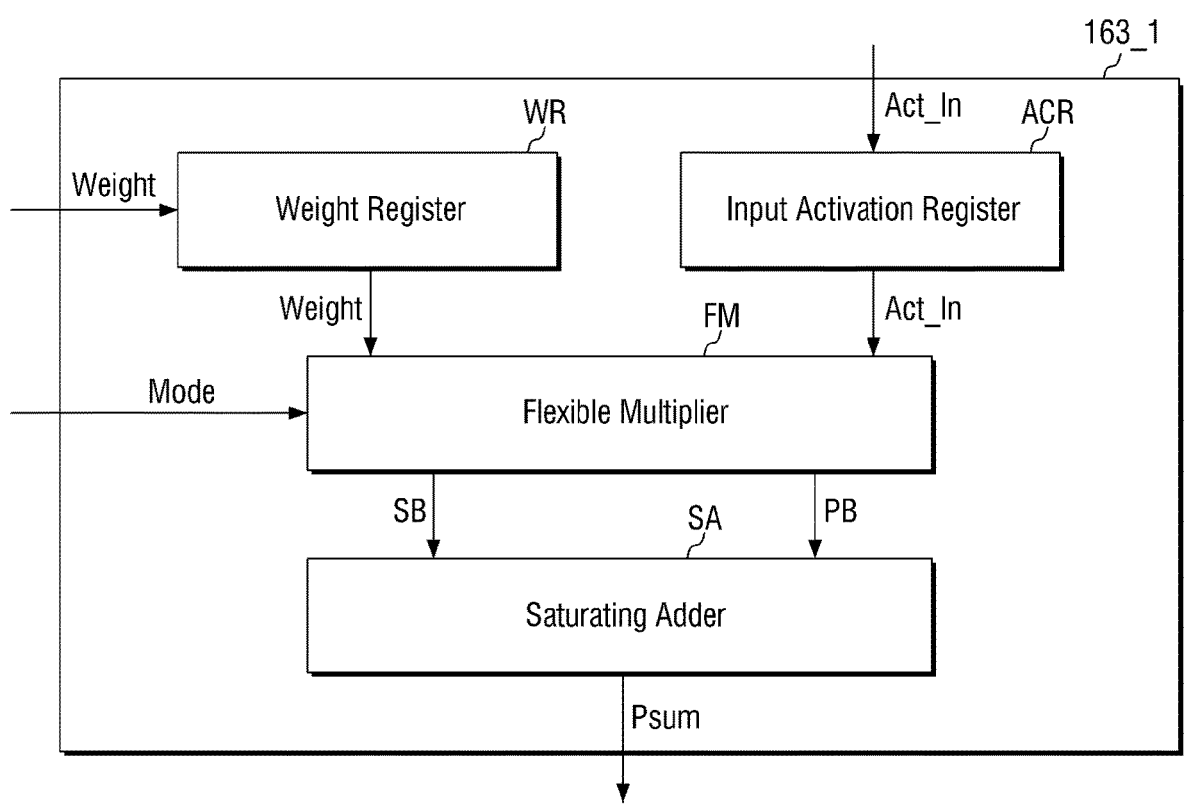
FIG. 10 is a block diagram for illustrating in detail the processing element of FIG. 9.

FIG. 10 is a block diagram for illustrating in detail the processing element of FIG. 9.

Referring to FIG. 10, the processing element 163_1 may include a weight register WR, an input activation register ACR, a flexible multiplier FM, and a saturating adder SA.

The weight register WR may receive and store a weight that is inputted to the processing element 163_1. The weight register WR may transmit the weight to the flexible multiplier FM.

The input activation register ACR may receive and store an input activation Act_In. The input activation register ACR may transmit the input activation Act_In to the flexible multiplier FM.

The flexible multiplier FM may receive the weight and the input activation Act_In. The flexible multiplier FM may perform multiplication of the weight and the input activation Act_In. The flexible multiplier FM may receive a mode signal Mode. In this case, the mode signal Mode may be a signal regarding which precision out of a first precision and a second precision is to be used to perform a calculation.

The flexible multiplier FM may output the multiplication result as result data. The result data may include a sign bit SB and a product bit PB. In this case, the sign bit SB may be a bit indicating the sign of the result data. The product bit PB may be a bit indicating the magnitude of the result data. The flexible multiplier FM may output the result data with the first precision or the second precision.

The saturating adder SA may receive the result data. In other words, the saturating adder SA may receive the sign bit SB and the product bit PB. The saturating adder SA may receive the result data multiple times and accumulate them. Accordingly, the saturating adder SA may generate subtotals Psum. Such subtotals Psum may be outputted from each processing element 163_1 and finally summed up. However, the present embodiment is not limited thereto.

Figure 11:
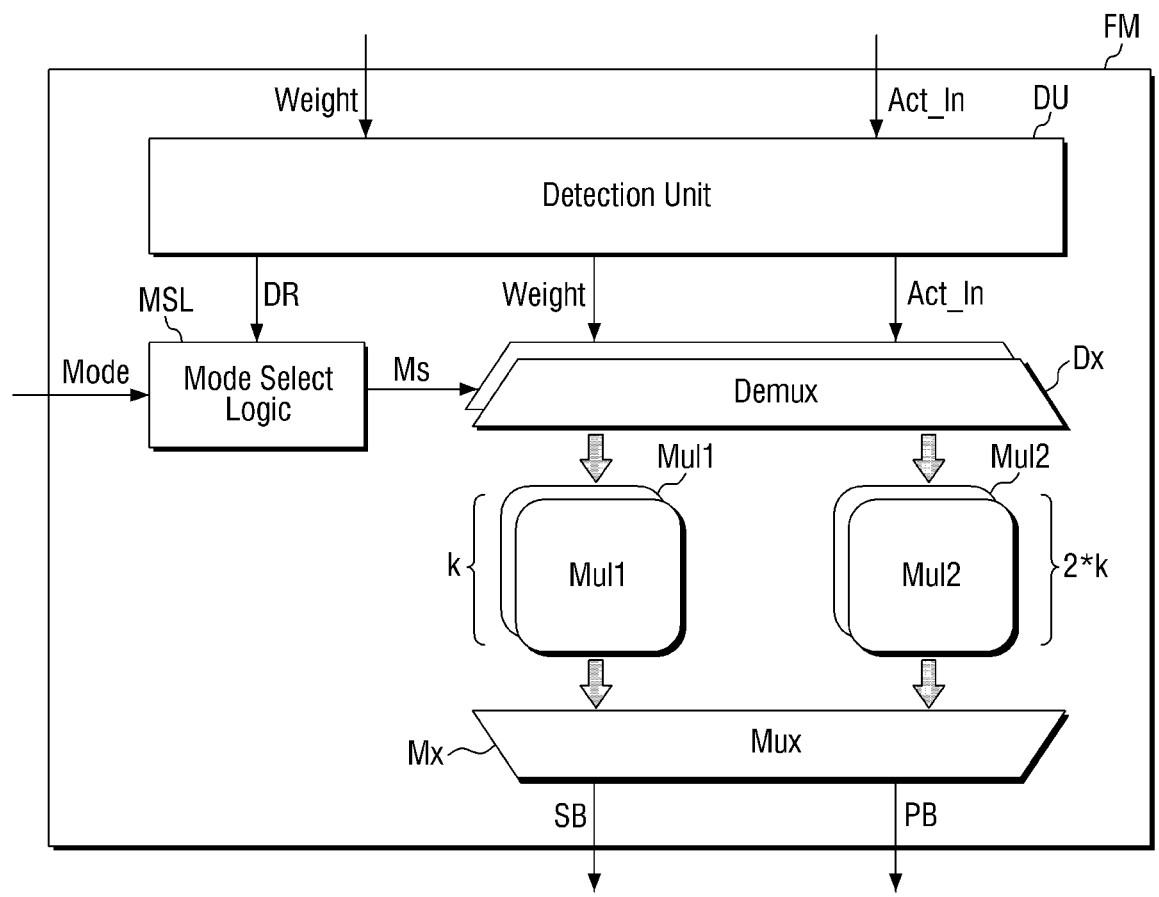
FIG. 11 is a block diagram for illustrating in detail the flexible multiplier of FIG. 10.

FIG. 11 is a block diagram for illustrating in detail the flexible multiplier of FIG. 10;

With reference to FIG. 11, the flexible multiplier FM may include a detection unit DU, a mode select logic MSL, a demultiplexer Dx, a first multiplier Mul1, a second multiplier Mul2, and a multiplexer Mx.

The detection unit DU may receive the weight and the input activation Act_In. The detection unit DU may detect whether the multiplication result of the weight and the input activation Act_In causes an overflow or underflow. In this case, the overflow may be an error that occurs if the result is larger than the numerical range according to the precision of the data, and the underflow may be an error that occurs if the result is smaller than the numerical range according to the precision of the data.

The detection unit DU may transmit the weight and the input activation Act_In to the demultiplexer Dx. Further, the detection unit DU may generate a detection result DR. The detection result DR may be a signal regarding whether the multiplication result of the weight and the input activation Act_In causes an overflow or underflow. If the multiplication result of the weight and the input activation Act_In causes an overflow or underflow, the detection result DR may be a first result. On the contrary, if the multiplication result of the weight and the input activation Act_In does not cause an overflow or underflow, the detection result DR may be a second result. The detection unit DU may transmit the detection result DR to the mode select logic MSL.

The mode select logic MSL may receive the mode signal Mode. In this case, the mode signal Mode may be a signal regarding in which mode of precision out of the first precision and the second precision the multiplication calculation is to be performed. If the mode signal Mode is a signal for the first precision, it may be a first mode signal. On the contrary, if the mode signal Mode is a signal for the second precision, it may be a second mode signal.

The mode select logic MSL may also receive the detection result DR. The mode select logic MSL may generate a mode selection signal Ms based on the mode signal Mode and the detection result DR.

In this case, the mode selection signal Ms may be a signal regarding in which mode for one of the first precision and the second precision the multiplication calculation is to be performed. The mode selection signal Ms may be a signal that allows a mode to be selected finally, unlike the mode signal Mode. In other words, the precision of data in the multiplication calculation performed by the flexible multiplier FM may be determined according to the mode selection signal Ms.

The mode selection signal Ms may also be any one of the first mode signal for the first precision and the second mode signal, similarly to the mode signal Mode. In this case, the mode selection signal Ms may be the same signal as the mode signal Mode or may be a different signal.

The demultiplexer Dx may receive the weight and the input activation Act_In from the detection unit DU. The demultiplexer Dx may also receive the mode selection signal Ms. The demultiplexer Dx may transmit the weight and the input activation Act_In to either the first multiplier Mul1 or the second multiplier Mul2. The demultiplexer Dx may determine, by the mode selection signal Ms, a path through which the weight and the input activation Act_In are transmitted. In addition, the demultiplexer Dx may divide and transmit at least one weight and at least one input activation Act_In to a plurality of first multipliers Mul1 or a plurality of second multipliers Mul2.

The first multiplier Mul1 may calculate in the first precision. That is, the first multiplier Mul1 may receive input data of the first precision. If the demultiplexer Dx transmits the weight and the input activation Act_In to the first multiplier Mul1, the weight and the input activation Act_In may be in the form of the first precision.

The second multiplier Mul2 may calculate in the second precision. That is, the second multiplier Mul2 may receive input data of the second precision. If the demultiplexer Dx transmits the weight and the input activation Act_In to the second multiplier Mul2, the weight and the input activation Act_In may be in the form of the second precision.

In this case, the number of the first multipliers Mul1 may be k, and the number of the second multipliers Mul2 may be 2k. In this case, k may be a natural number.

The multiplexer Mx may receive a calculation result, i.e., a result of a multiplication calculation, from either the first multiplier Mul1 or the second multiplier Mul2. The multiplexer Mx may receive results of multiplication calculations of input data of the first precision and input data of the first precision from the first multiplier Mul1, and may receive results of multiplication calculations of input data of the second precision and input data of the second precision from the second multiplier Mul2.

If the mode selection signal Ms is the first mode signal, the multiplexer Mx may receive k calculation results provided from the k first multipliers Mul1 and generate result data. The result data may include a sign bit SB and a product bit PB. That is, the multiplexer Mx may generate one piece of result data by combining k calculation results.

If the mode selection signal Ms is the second mode signal, the multiplexer Mx may receive 2k calculation results provided from the 2k second multiplexers Mx and generate result data. The result data may include a sign bit SB and a product bit PB. That is, the multiplexer Mx may generate one piece of result data by combining 2k calculation results.

Figure 12:
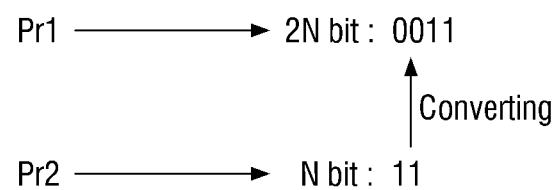
FIG. 12 is an exemplary diagram for illustrating first and second precisions.

FIG. 12 is an exemplary diagram for illustrating the first and second precisions.

Referring to FIG. 12, the first precision Pr1 may be 2N bits. In this case, N may be a natural number. The second precision Pr2 may be N bits. In other words, the first precision Pr1 may have twice as many bits as the second precision Pr2. For example, the first precision Pr1 and the second precision Pr2 may be INT4 and INT2, respectively. Alternatively, the first precision Pr1 and the second precision Pr2 may be at least one of INT8 and INT4, INT16 and INT8, and INT32 and INT16, respectively. The first precision Pr1 and the second precision Pr2 may be an INT type, that is, an integer type precision. However, the present embodiment is not limited thereto.

In FIG. 12, the first precision Pr1 and the second precision Pr2 are shown as INT4 and INT2 as examples, respectively. The second precision Pr2 is shown as '11' as an example, and if this is converted into the first precision Pr1, it can be represented by '0011'. Of course, this is just one example and is not limited thereto.

If the second precision Pr2 is INT2, the number of cases for representing a general number may be very few. In other words, if two bits are used, only a total of four cases can be represented. Therefore, by quantizing two bits, it is possible to represent more cases of numbers. As an example, the second precision Pr2 may include two bits, and the two bits may include a first bit representing a sign and a second bit representing a magnitude.

With reference to the table below, the 2-bit precision can be represented by symmetric quantization and asymmetric quantization. In this case, it can be represented by the following example.

| Quantizer type | # of bits | Representation | Range |
| --- | --- | --- | --- |
| Symmetric quantization | 2 | −Y, −X, X, Y | X = 1, Y = 2, 3, 4, 5, 6<br>X = 2, Y = 3, 5, 7, 9 |
| Asymmetric quantization | 2 | −A, −B, C, D | Any value<br>A > B, D > C |

At this time, in the case of the second precision Pr2 of 2-bits, an overflow or underflow may occur frequently by multiplication calculations. That is, the calculation result of the multiplication between the second precisions Pr2 may yield a resulting form in which the number of bits of the second precision Pr2 is doubled. In other words, the calculation result of the multiplication calculation of INT2 and INT2 can be represented by INT4.

However, for example, if '11' of INT2 represents decimal number 9, the product of '11' and '11' in INT 2 is 81 in decimal, which cannot be represented by INT4 of 4 bits, resulting in an overflow. In such a case, by first converting '11' to INT4 like '0011', the decimal number 81 can be clearly represented through the multiplication calculation results of INT8s.

Therefore, the present embodiment can change the precision if such an overflow or underflow occurs, and thus can perform the conversion of increasing the number of bits of data. Through this, a low number of bits with high efficiency is usually used, but when a calculation might become inaccurate, a conversion can be made to a higher number of bits to thereby improve the accuracy of the calculation while maintaining optimal efficiency.

In particular, since INT2 has a narrow range and thus frequent quantization, such an overflow or underflow may occur very frequently. INT2 has high data efficiency due to its small number of bits, so it can be highly useful in cases where hardware resources are limited, such as mobile devices. Therefore, the present embodiment can prevent a decrease in accuracy resulting from an overflow or underflow that frequently occurs in an area where a precision of a low bit number such as this INT2 is utilized.

Figure 13:
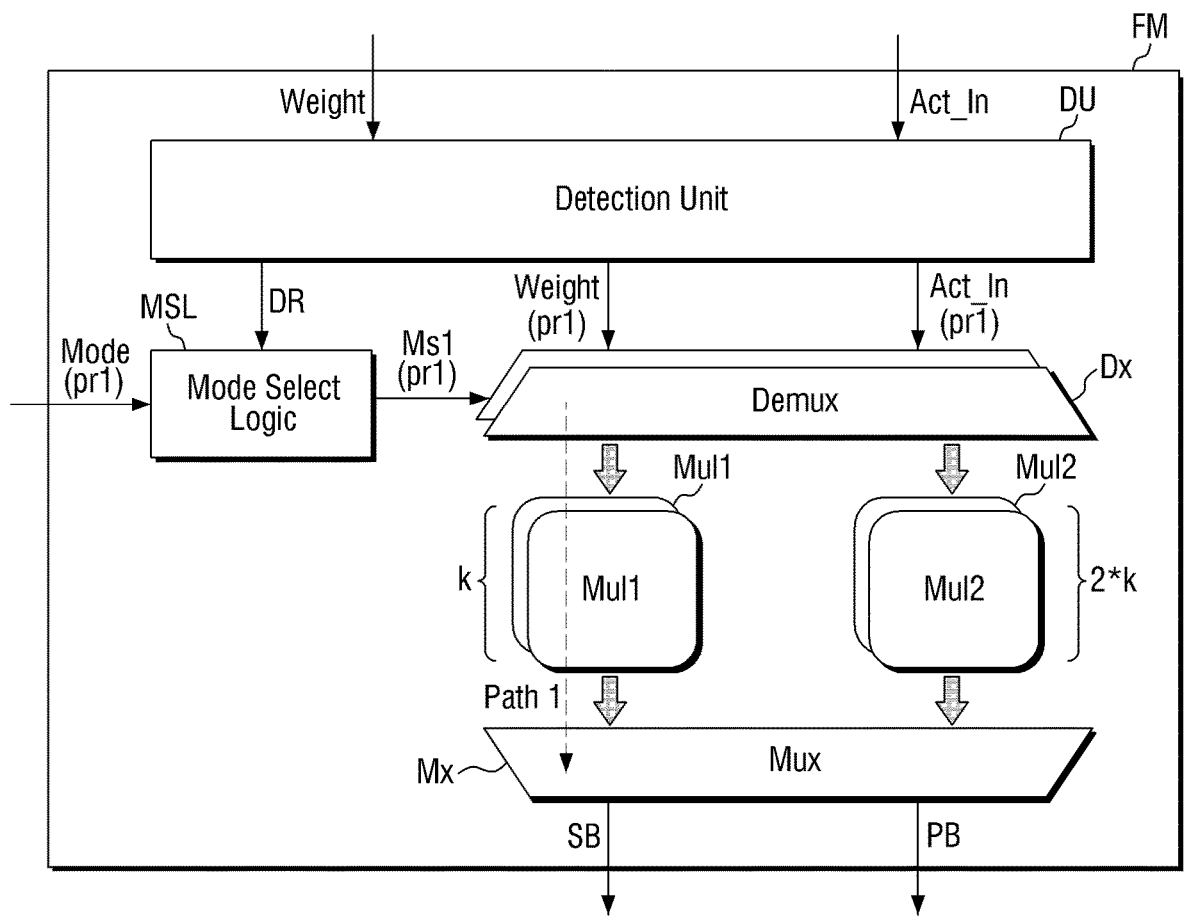
FIG. 13 is a diagram for illustrating an operation when the flexible multiplier of FIG. 10 has received a first mode signal.

FIG. 13 is a diagram for illustrating an operation when the flexible multiplier of FIG. 10 has received the first mode signal.

Referring to FIG. 13, the mode signal Mode may be the first mode signal. In this case, the detection result DR may be the first result or the second result. The first result may be a case in which an overflow or underflow occurs, and the second result may be a case in which an overflow or underflow does not occur.

When the mode select logic MSL receives the first mode signal, the mode select logic MSL may adopt the first mode signal as the mode selection signal Ms regardless of the detection result DR. This is because even if the detection result DR is the first result, the overflow and underflow can be prevented if the first precision is used as the first mode signal. On the contrary, even if the detection result DR is the second result, there is no problem in using the first precision as the first mode signal. Therefore, if the mode signal Mode is the first mode signal, the mode select logic MSL may be the first mode signal regardless of the detection result DR.

In this case, the detection unit DU may convert the weight and the input activation Act_In into the first precisions Pr1 and transmit them to the demultiplexer Dx. The demultiplexer Dx may transmit the weight and the input activation Act_In to the first multiplier Mul1. Since there are k first multipliers Mul1, the demultiplexer Dx may divide and transmit the weight and the input activation Actin, respectively, to the first multipliers Mul1.

Subsequently, the k first multipliers Mul1 may perform multiplication calculations in the first precision Pr1 and transmit the k calculation results to the multiplexer Mx. The multiplexer Mx may receive the k calculation results and generate one piece of result data. The result data may include a sign bit SB and a product bit PB.

That is, in this case, the calculation of the weight and the input activation Act_In may proceed in a first path Path 1 passing through the first multiplier Mul1.

Figure 14:
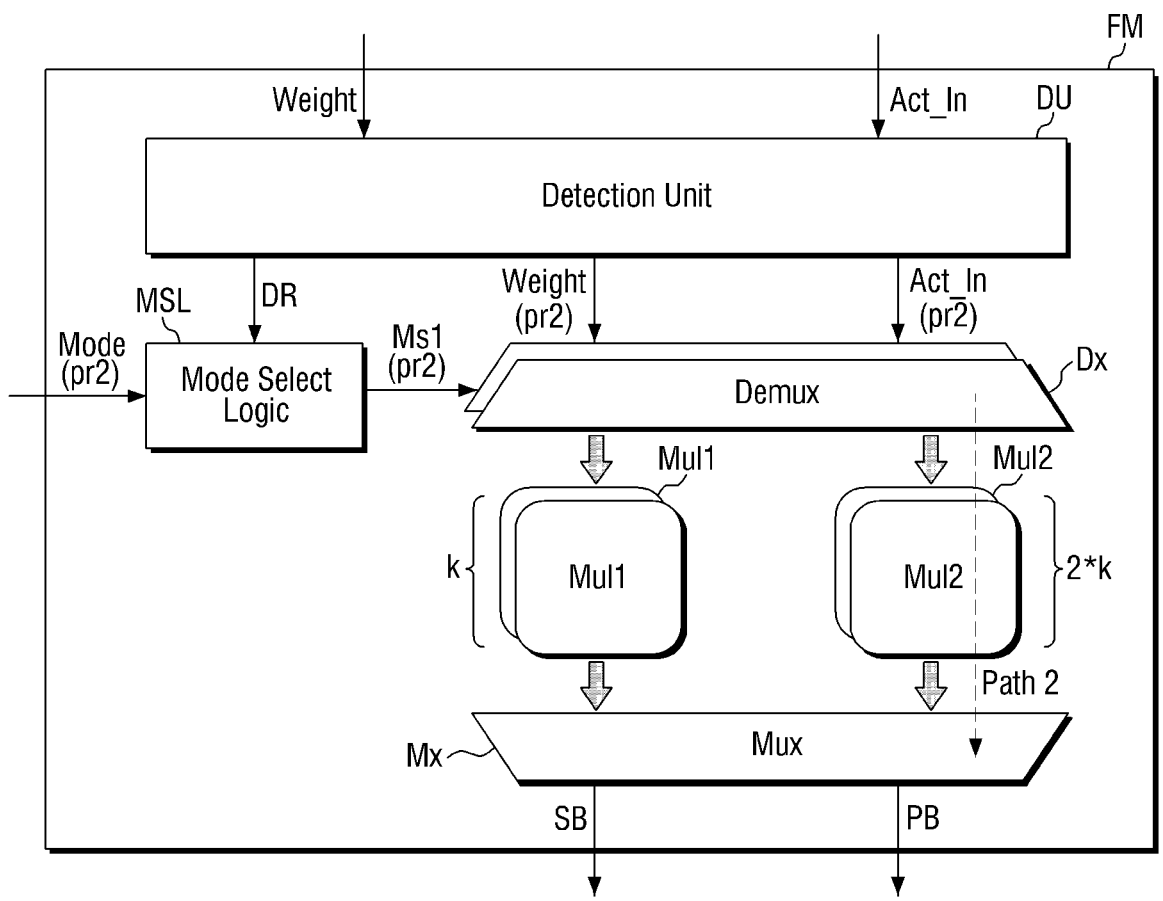
FIG. 14 is a diagram for illustrating an operation when the flexible multiplier of FIG. 10 has received a second mode signal and a second result.

FIG. 14 is a diagram for illustrating an operation when the flexible multiplier of FIG. 10 has received a second mode signal and a second result.

Referring to FIG. 14, the mode signal Mode may be the second mode signal. At this time, the detection result DR may be the second result. The second result may be a case in which an overflow and an underflow do not occur.

When the mode select logic MSL receives the second mode signal, the mode select logic MSL may generate the mode selection signal Ms by taking the detection result DR into account. The mode selection signal Ms may adopt the second mode signal as it is when the detection result DR is the second result. This is because there is no overflow or underflow, and thus the accuracy is not reduced even if the calculation is carried out in the second precision Pr2, so that the efficiency can be maximized in the second precision Pr2.

In this case, the detection unit DU may transmit the weight and the input activation Act_In to the demultiplexer Dx in the second precision Pr2. The demultiplexer Dx may transmit the weight and the input activation Act_In to the second multiplier Mul2. Since there are 2k second multipliers Mul2, the demultiplexer Dx may divide and transmit the weight and input activation Actin, respectively, to the second multiplier Mul2.

Subsequently, the 2k second multipliers Mul2 may perform multiplication calculations in the second precision Pr2 and transmit the 2k calculation results to the multiplexer Mx. The multiplexer Mx may receive the 2k calculation results and generate one piece of result data. The result data may include a sign bit SB and a product bit PB.

That is, in this case, the calculation of the weight and the input activation Act_In may proceed in a second path Path 2 passing through the second multiplier Mul2.

Figure 15:
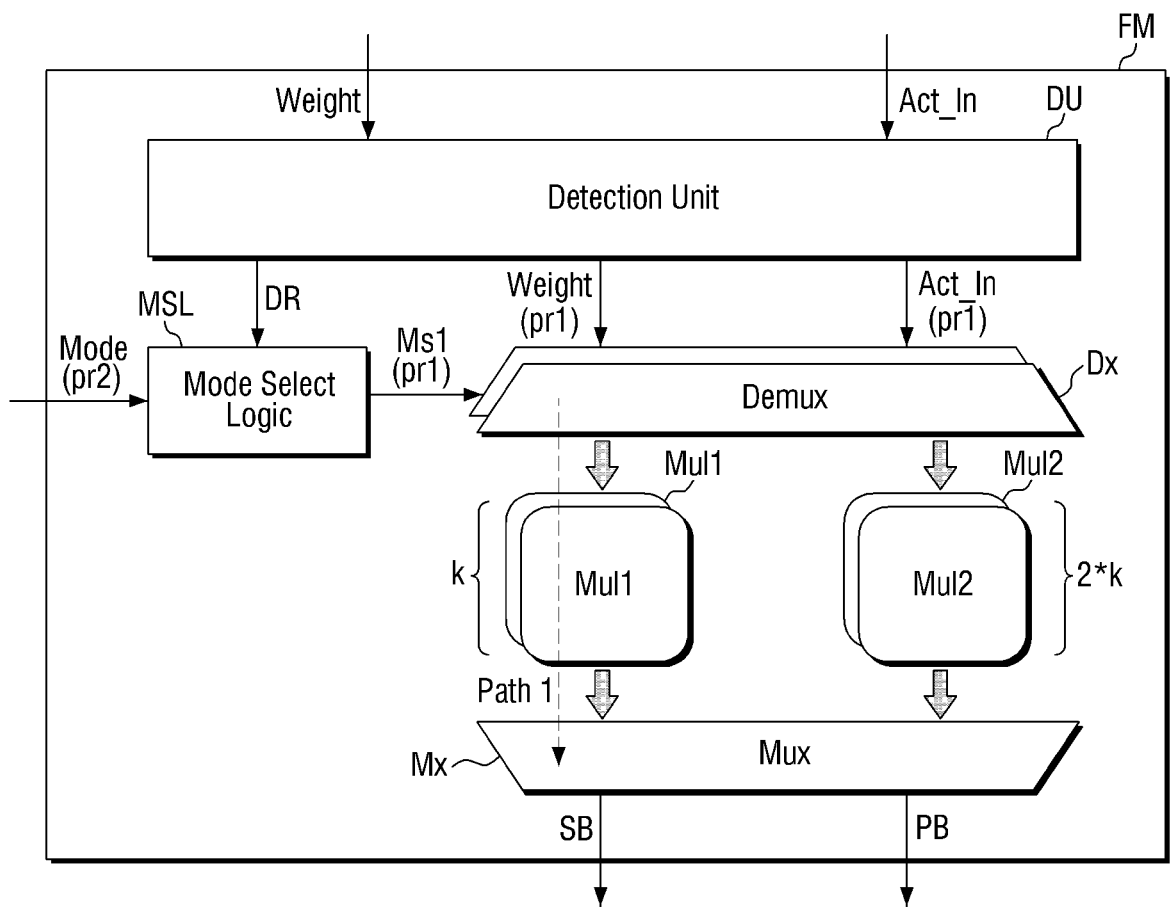
FIG. 15 is a diagram for illustrating an operation when the flexible multiplier of FIG. 10 has received a second mode signal and a first result.

FIG. 15 is a diagram for illustrating an operation when the flexible multiplier of FIG. 10 has received the second mode signal and the first result.

Referring to FIG. 15, the mode signal Mode may be the second mode signal. At this time, the detection result DR may be the first result. The first result may be a case in which an overflow and an underflow occur.

When the mode select logic MSL receives the second mode signal, the mode select logic MSL may generate the mode selection signal Ms by taking the detection result DR into account. The mode selection signal Ms may adopt the first mode signal instead of the second mode signal when the detection result DR is the first result. This is because, since an overflow and an underflow occur, the accuracy will decrease if the calculation is carried out in the second precision Pr2. Accordingly, it is possible to prevent a decrease in accuracy by converting the second precision Pr2 into the first precision Pr1.

In this case, the detection unit DU may transmit the weight and the input activation Act_In to the demultiplexer Dx in the first precision Pr1. The demultiplexer Dx may transmit the weight and the input activation Act_In to the first multiplier Mul1. Since there are k first multipliers Mul1, the demultiplexer Dx may divide and transmit the weight and the input activation Actin, respectively, to the first multipliers Mul1.

Subsequently, the k first multipliers Mul1 may perform multiplication calculations in the first precision Pr1 and transmit the k calculation results to the multiplexer Mx. The multiplexer Mx may receive the k calculation results and generate one piece of result data. The result data may include a sign bit SB and a product bit PB.

That is, in this case, the calculation of the weight and the input activation Act_In may proceed in a first path Path 1 passing through the first multiplier Mul1.

Figure 16:
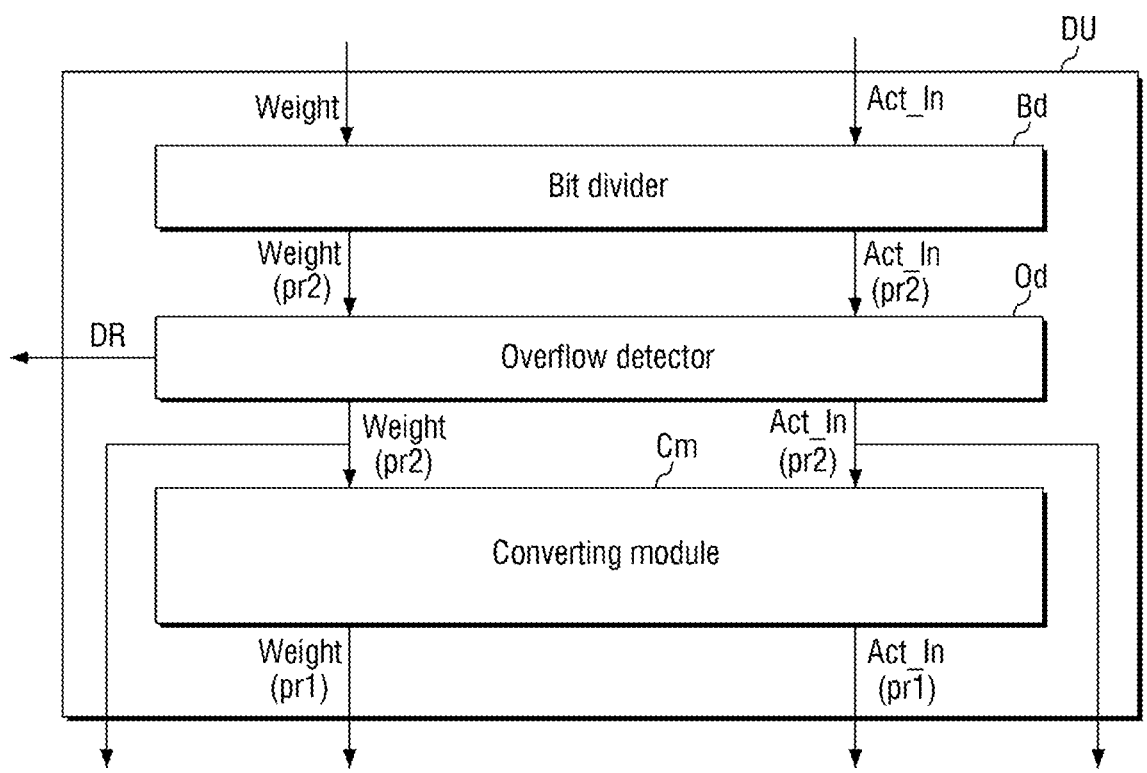
FIG. 16 is a block diagram for illustrating in detail the detection unit of FIG. 11.

FIG. 16 is a block diagram for illustrating in detail the detection unit of FIG. 11.

With reference to FIG. 16, the detection unit DU may include a bit divider Bd, an overflow detector Od, and a converting module Cm.

The bit divider Bd may receive the weight and the input activation Act_In. The bit divider Bd may divide the weight and the input activation Act_In into a preset number of bits of the second precision Pr2. Accordingly, the weight and the input activations Act_In may be plural and may each be data in the second precision Pr2.

The overflow detector Od may detect an overflow and an underflow. The overflow detector Od may determine whether calculation results of the respective multiplications of a plurality of weights Weight of the second precision Pr2 and a plurality of input activations Act_In of the second precision Pr2 will cause an overflow or underflow. Accordingly, the overflow detector Od may generate a detection result DR. The detection result DR may be a first result if an overflow or underflow occurs. The detection result DR may be a second result if an overflow and an underflow do not occur.

In the case of the first result, the overflow detector Od may transmit the weight and the input activation Act_In to the Od converting module Cm. In the case of the second result, the overflow detector Od may transmit the weight and the input activation Act_In directly to the demultiplexer Dx without transmitting them to the converting module Cm.

The converting module Cm may convert the weight of the second precision Pr2 into the first precision Pr1. Further, the converting module Cm may convert the input activation Act_In of the second precision Pr2 into the first precision Pr1. The overflow detector Od may transmit the weight and the input activation Act_In directly to the demultiplexer Dx without transmitting them to the converting module Cm.

Through this, the present embodiment can transmit and calculate data, usually with a low number of bits. In addition, when an overflow or underflow that affects accuracy occurs, the number of bits can be increased to prevent the accuracy from deteriorating.

Figure 17:
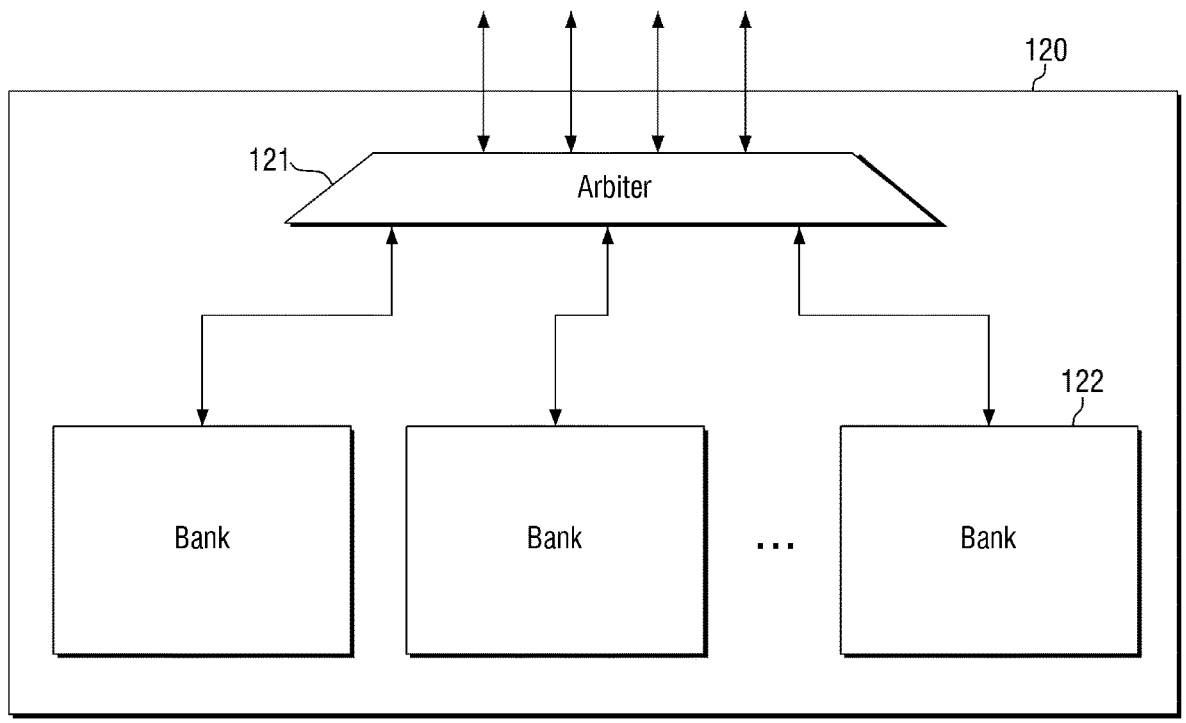
FIG. 17 is a block diagram for illustrating in detail the L0 memory of FIG. 7.

FIG. 17 is a block diagram for illustrating in detail the L0 memory of FIG. 7.

With reference to FIG. 17, the L0 memory 120 may include an arbiter 121 and at least one local memory bank 122.

When data is stored in the L0 memory 120, the arbiter 121 may receive the data from the load engine 113a. At this time, the local memory banks 122 may be allocated to the data in a round robin fashion. Accordingly, the data may be stored in any one of the at least one local memory bank 122.

Conversely, when the data is loaded from the L0 memory 120, the arbiter 121 may receive the data from the local memory bank 122 and transmit them to the store engine 113b. The store engine 113b may store data externally via the local interconnection 200.

Figure 18:
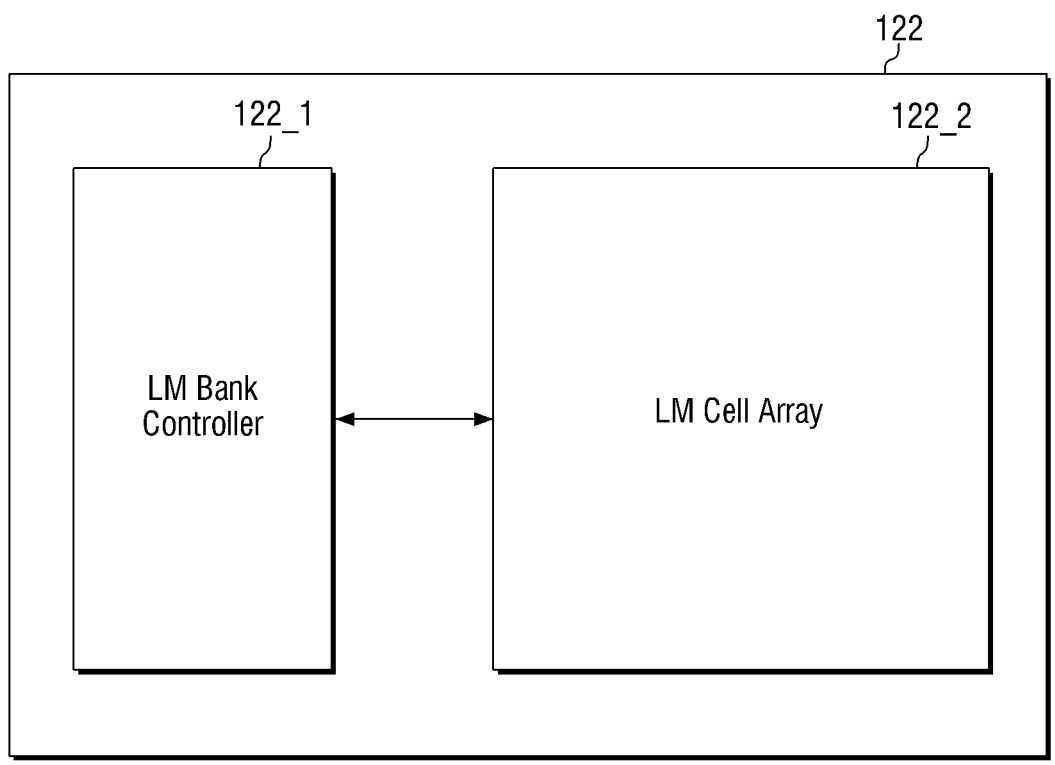
FIG. 18 is a block diagram for illustrating in detail the local memory bank of FIG. 21.

FIG. 18 is a block diagram for illustrating in detail the local memory bank of FIG. 17.

With reference to FIG. 18, the local memory bank 122 may include a local memory bank controller 122_1 and a local memory bank cell array 122_2.

The local memory bank controller 122_1 may manage read and write operations via the addresses of data stored in the local memory bank 122. That is, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 19:
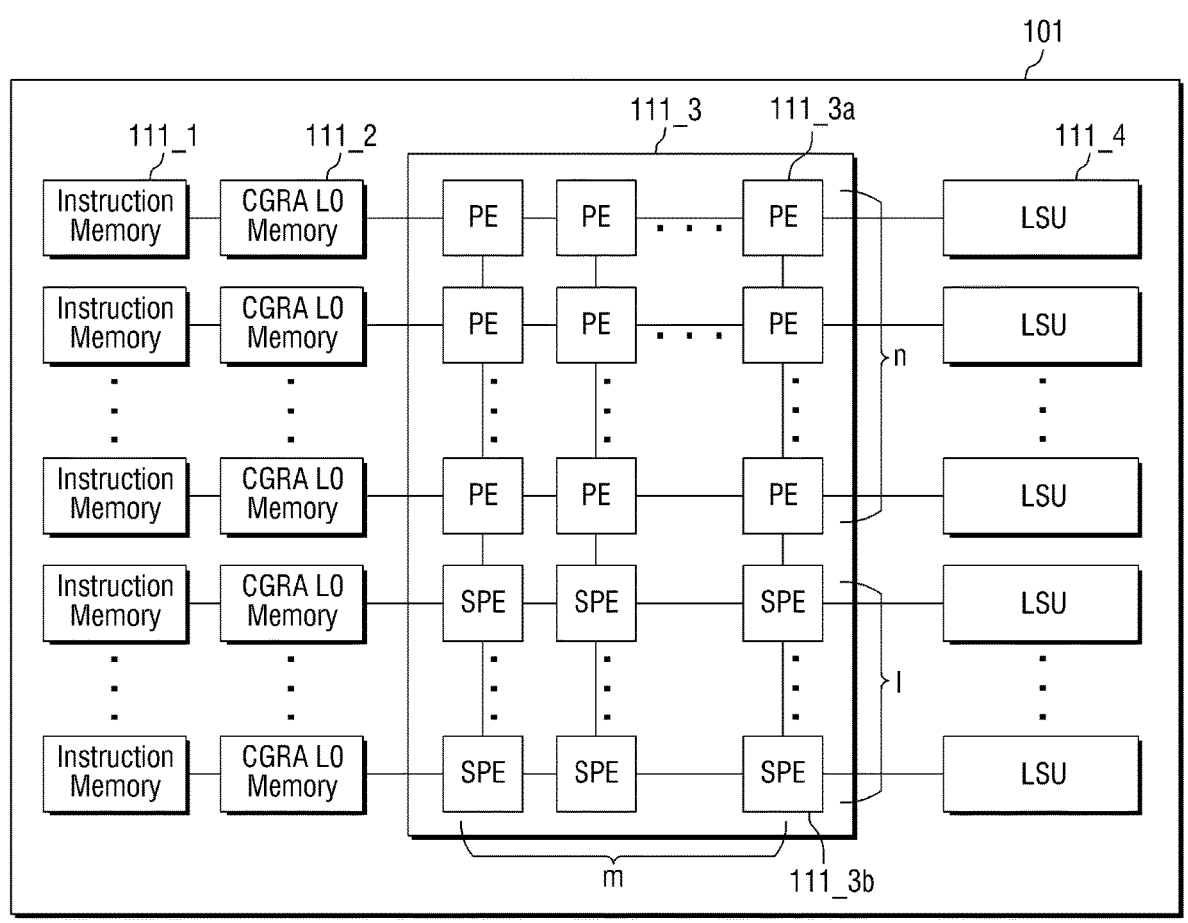
FIG. 19 is a block diagram for illustrating in detail the structure of the neural processing device of FIG. 1.

FIG. 19 is a block diagram for illustrating in detail the structure of a neural processing device in accordance with some embodiments of the present inventive concept.

Referring to FIG. 19, the neural core 101 may be of a CGRA structure, unlike the neural core 100. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 111_1 may sequentially store instructions internally, and provide the stored instructions to the PE array 111_3. In this case, the instructions may instruct the operation of the processing element 111_3a included in each PE array 111_3.

The CGRA L0 memory 111_2 is a memory located inside the neural core 101, and may receive all the input data required for the tasks by the neural core 101 from the outside and temporarily store them. Further, the CGRA L0 memory 111_2 may temporarily store the output data calculated by the neural core 101 in order to transmit them to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) lower than L1. In this case, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include a plurality of processing elements 111_3a and particular processing elements 111_3b therein.

The processing elements 111_3a and the particular processing elements 111_3b may be arranged in rows and columns. The processing elements 111_3a and the particular processing elements 111_3b may be arranged in m columns. Further, the processing elements 111_3a may be arranged in n rows, and the particular processing elements 111_3b may be arranged in l rows. Accordingly, the processing elements 111_3a and the particular processing elements 111_3b may be arranged in (n+l) rows and m columns.

The LSU 111_4 may receive at least one of data, a control signal, and a synchronization signal from the outside via the L1 interconnection 130. The LSU 111_4 may transmit at least one of the received data, control signal, and synchronization signal to the CGRA L0 memory 111_2. Similarly, the LSU 111_4 may transmit at least one of the data, control signal, and synchronization signal to the outside via the L1 interconnection 130.

The neural core 101 may have a CGRA (Coarse Grained Reconfigurable Architecture) structure. Accordingly, in the neural core 101, the respective processing elements 111_3a and particular processing elements 111_3b of the PE array 111_3 may be connected to at least one of the CGRA L0 memory 111_2, the instruction memory 111_1, and the LSU 111_4, respectively. In other words, the processing elements 111_3a and the particular processing elements 111_3b do not have to be connected to all of the CGRA L0 memory 111_2, the instruction memory 111_1, and the LSU 111_4, but may be connected to some of them.

Further, the processing elements 111_3a and the particular processing elements 111_3b may be different types of processing elements from each other. Accordingly, out of the CGRA L0 memory 111_2, the instruction memory 111_1, and the LSU 111_4, the elements connected to the processing elements 111_3a and the elements connected to the particular processing elements 111_3b may be different from each other.

The neural core 101 of the present inventive concept having a CGRA structure enables high-level parallel calculations, and since direct data exchange between the processing elements 111_3a and the particular processing elements 111_3b is possible, the power consumption may be low. In addition, by including two or more types of processing elements 111_3a, optimization according to various calculation tasks may be possible.

For example, if the processing elements 111_3a are processing elements that perform two-dimensional calculations, the particular processing elements 111_3b may be processing elements that perform one-dimensional calculations. However, the present embodiment is not limited thereto.

Figure 20:
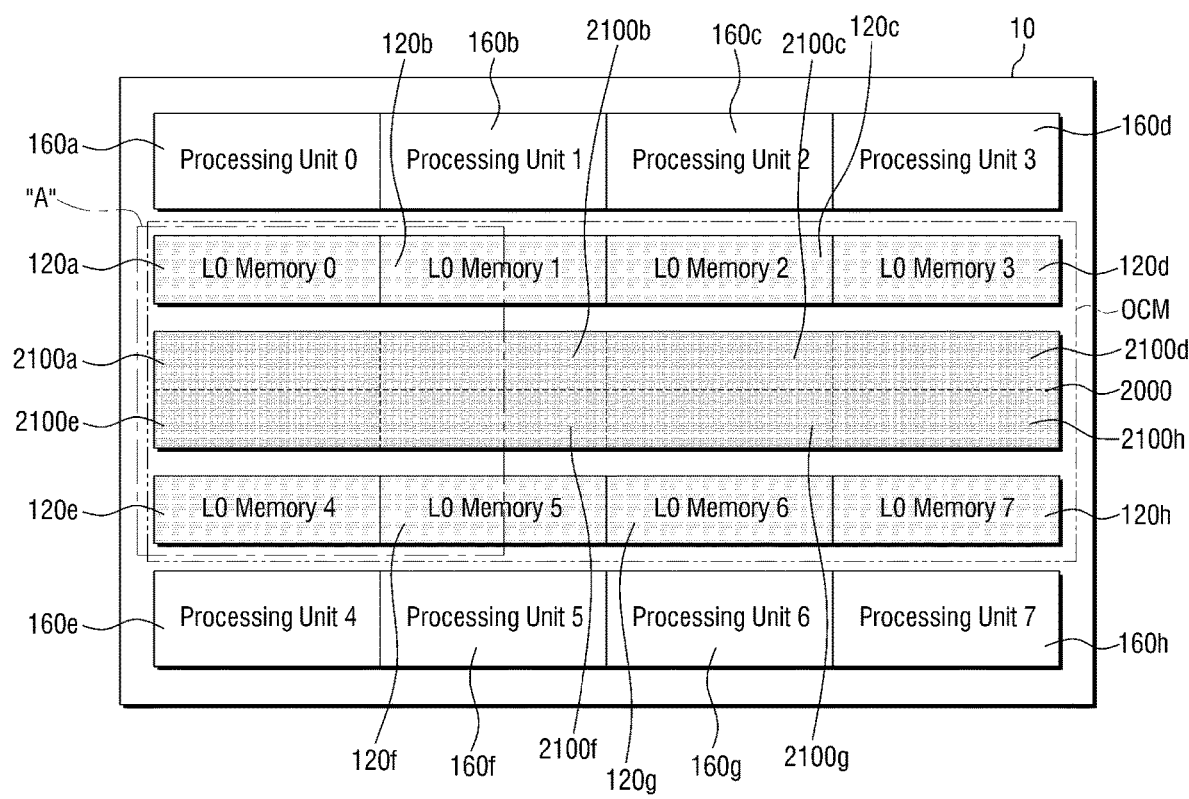
FIG. 20 is a block diagram for illustrating memory reconstruction of the neural processing system of FIG. 1.

FIG. 20 is a block diagram for illustrating memory reconfiguration of a neural processing system in accordance with some embodiments of the present inventive concept.

Figure 24:
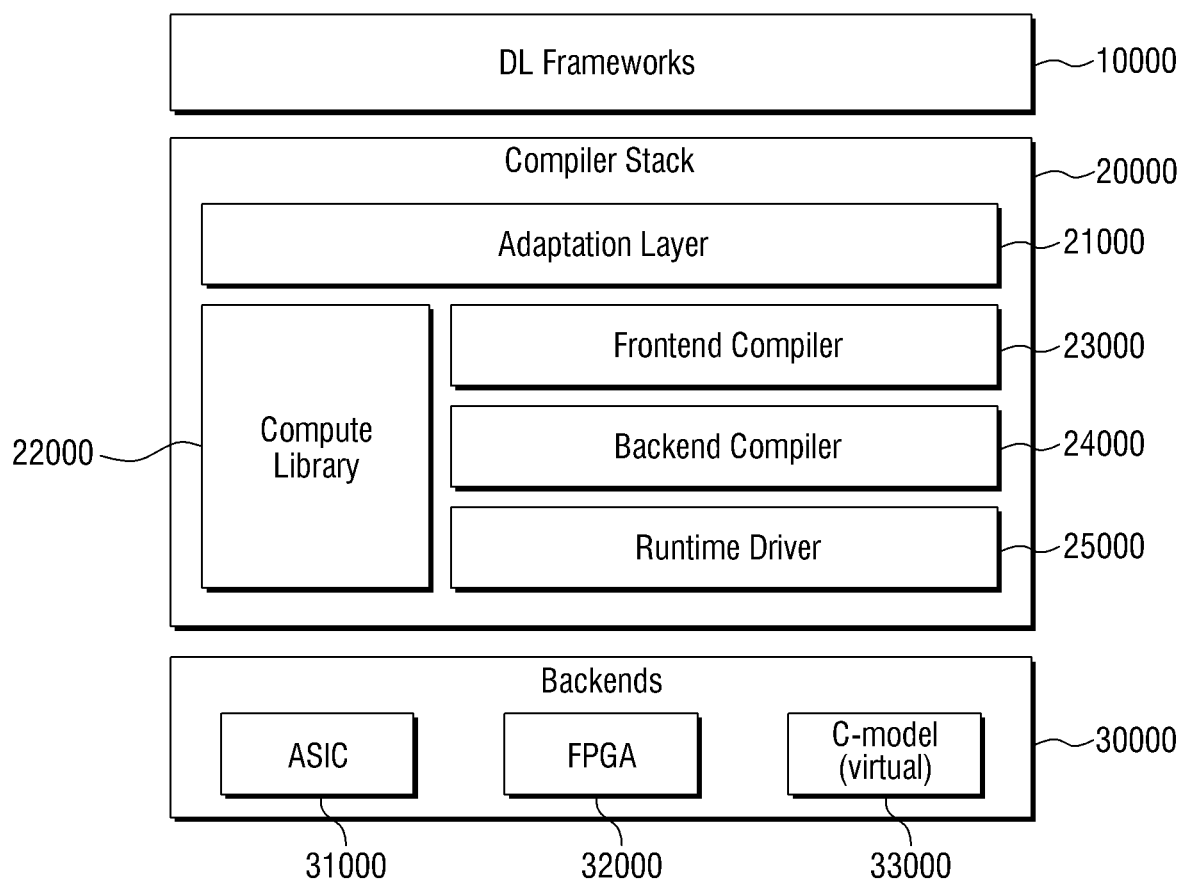
FIG. 24 is a block diagram for illustrating a software hierarchy of the neural processing device of FIG. 1.

With reference to FIG. 20, the neural core SoC 10 may include first to eighth processing units 160a to 160h and an on-chip memory OCM. Although FIG. 24 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 100a and the second processing unit 100b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 5000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 21:
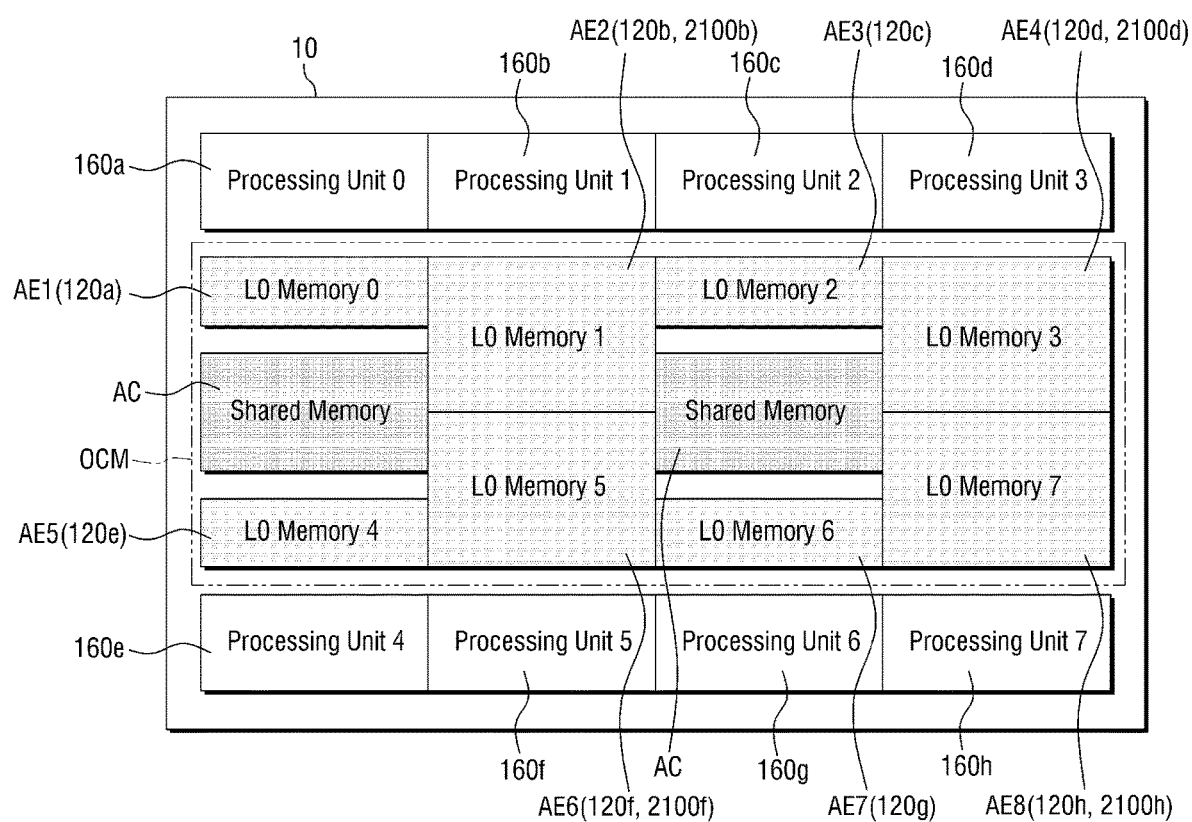
FIG. 21 is a block diagram showing an example of memory reconstruction of the neural processing system of FIG. 1.

FIG. 21 is a block diagram showing an example of memory reconstruction of a neural processing system in accordance with some embodiments of the present inventive concept.

With reference to FIGS. 20 and 21, first, third, fifth, and seventh dedicated areas AE1, AE3, AE5, and AE7 for each of the first, third, fifth, and seventh processing units 100a, 100c, 100e, and 100g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 100b, 100d, 100f, and 100h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the present embodiment may convert an area corresponding to each neural core into a logical L0 memory and a logical global memory of an optimized ratio and may use them. The shared memory 2000 may perform the adjustment of this ratio at runtime.

That is, each neural core may perform the same task in some cases, but may perform different tasks in other cases as well. In this case, the amount of the L0 memory and the amount of the global memory required for the tasks carried out by each neural core are inevitably different each time. Accordingly, if the composition ratio of the L0 memory and the shared memory is fixedly set as in the conventional on-chip memory, there may occur inefficiency due to the calculation tasks assigned to each neural core.

Therefore, the shared memory 2000 of the neural processing device in accordance with the present embodiment may set an optimal ratio of the L0 memory and the global memory according to calculation tasks during the runtime, and may enhance the efficiency and speed of calculation.

Figure 22:
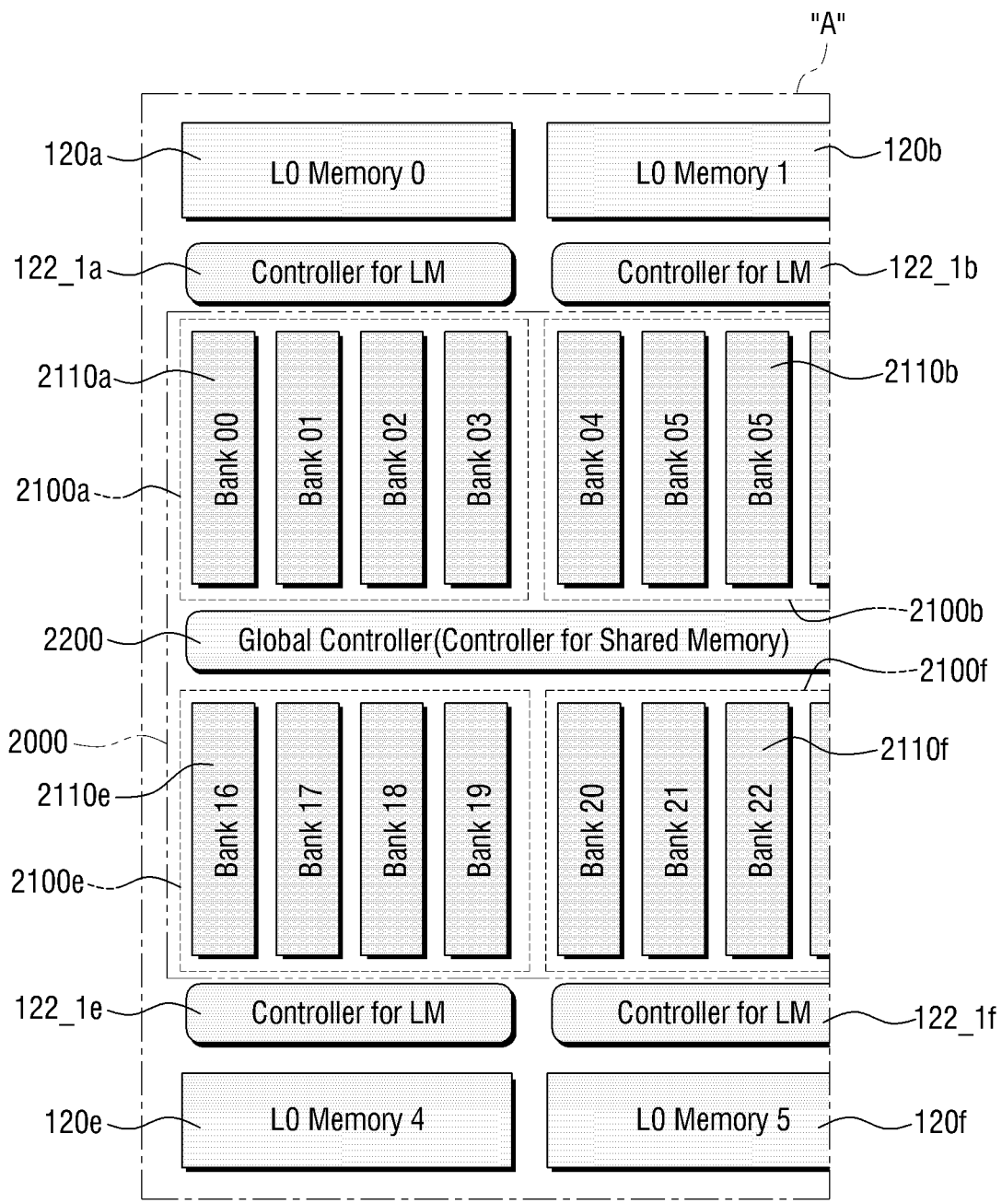
FIG. 22 is an enlarged block diagram of a portion A of FIG. 24.

FIG. 22 is an enlarged block diagram of a portion A of FIG. 20.

With reference to FIGS. 20 and 22, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the present embodiment, but the description thereof will be omitted for convenience.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented in.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 141h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. However, the present embodiment is not limited thereto.

The global controller 2200 may connect the first to eighth memory units 2100a to 2100h with the global interconnection 5000 of FIG. 3. The first to eighth memory units 2100a to 2100h may exchange data with the off-chip memory 30 of FIG. 1 or may exchange data with the first to eighth L0 memories 120a to 120h, respectively, by means of the global controller 2200.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes.

The respective first memory banks 2110a may all be memory devices of the same size. However, the present embodiment is not limited thereto. FIG. 15 illustrates that four memory banks are included in one memory unit.

Likewise, the second, fifth, and sixth memory units 2100b, 2100e, and 2100f may include at least one second, fifth, and sixth memory banks 2110b, 2110e, and 2110f, respectively.

Hereinafter, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the present embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may occupy the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may occupy the entire first memory unit 2100a.

In this case, the ratio of the first area to the second area may be different from the ratio of the third area to the fourth area. However, the present embodiment is not limited thereto. Accordingly, the ratio of the first area to the second area may be the same as the ratio of the third area to the fourth area. In other words, the memory composition ratio in each memory unit may vary as desired.

In general, in the case of the conventional system on a chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly inevitably in the case of tasks that require more data quickly than the predetermined capacity of the L0 memory, and even when the need for the global memory is not great, there is no way to utilize the remaining global memory, resulting in inefficiency.

On the contrary, the shared memory 2000 in accordance with some embodiments of the present inventive concept may be controlled selectively by any one of the two controllers depending on the cases. In this case, the shared memory 2000 may be controlled not only as a whole by a determined one of the two controllers but also independently for each memory unit or each memory bank.

Through this, the shared memory 2000 in accordance with the present embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000 in accordance with the present embodiment, the composition ratio of the memory can be changed during the runtime even when calculation steps change according to each layer, making fast and efficient deep learning tasks possible.

Figure 23:
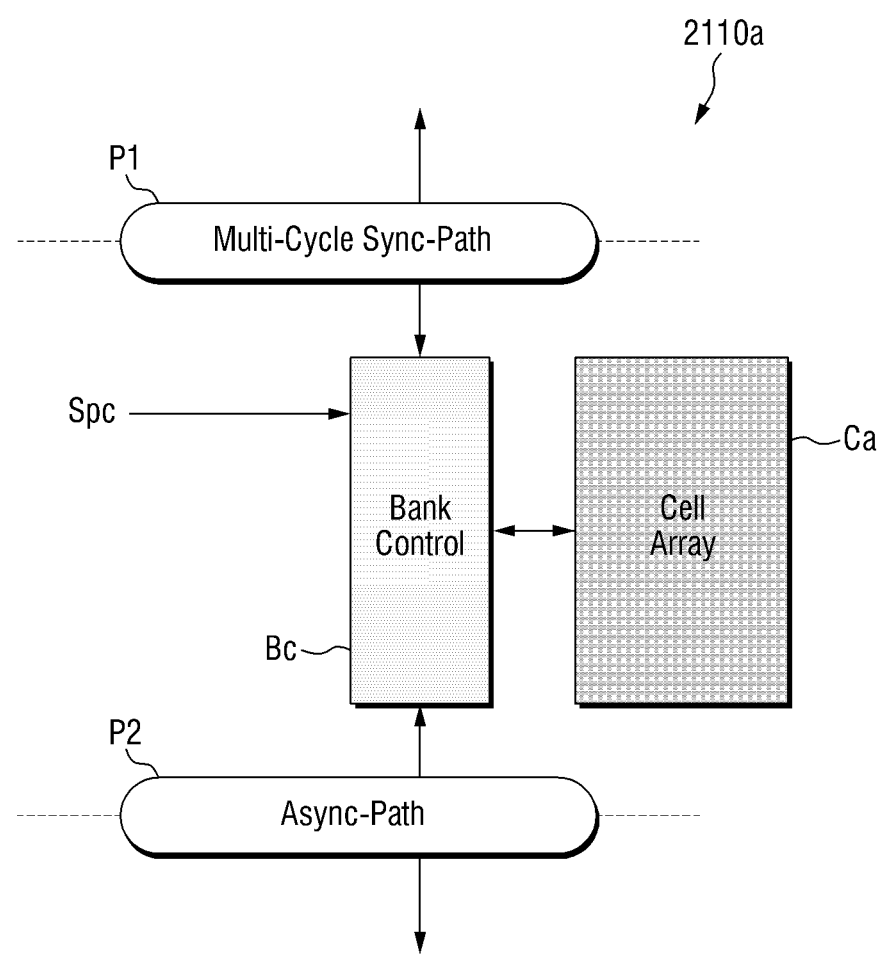
FIG. 23 is a diagram for illustrating in detail the first memory bank of FIG. 26.

FIG. 23 is a diagram for illustrating in detail the first memory bank of FIG. 22. Although FIG. 23 illustrates the first memory bank 2110a, other memory banks may also have the same structure as the first memory bank 2110a.

With reference to FIG. 23, the first memory bank 2110a may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca accordingly.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. That is, the user may directly apply an input to the path control signal Spc in order to select the most optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. That is, a first interface may be used when the bank controller Bc exchanges data with the first path unit P1, and a second interface may be used when the bank controller Bc exchanges data with the second path unit P2. In this case, the first interface and the second interface may be different from each other.

Further, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 100a. In this case, "directly" may mean being exchanged with each other without going through the global interconnection 5000. In other words, the first processing unit 100a may exchange data directly with the first L0 memory 120a, and the first processing unit 100a may exchange data via the first path unit P1 when the shared memory 2000 is implemented logically in the L0 memory type. The first path unit P1 may include L0 memory controllers including the first L0 memory controller 122_1a and the second L0 memory controller 122_1b of FIG. 14.

The first path unit P1 may form a multi-cycle sync-path. That is, the operating clock frequency of the first path unit P1 may be the same as the operating clock frequency of the first processing unit 100a. The first L0 memory 120a may quickly exchange data at the same clock frequency as the operating clock frequency of the first processing unit 100a in order to quickly exchange data at the same speed as the operation of the first processing unit 100a. Likewise, the first path unit P1 may also operate at the same clock frequency as the operating clock frequency of the first processing unit 100a.

At this time, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not needed separately, and thus, a delay of data transmission may not occur. Accordingly, faster and more efficient data exchange can be possible.

In FIG. 23, the operating clock frequency of the first path unit P1 may be 1.5 GHz as an example. This may be twice the frequency of 750 MHz of the bank controller Bc. However, the present embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 100a not directly but via the global interconnection 5000. In other words, the first processing unit 100a may exchange data with the cell array Ca via the global interconnection 5000 and the second path unit P2. In this case, the cell array Ca may exchange data not just with the first processing unit 100a but also with other neural cores.

That is, the second path unit P2 may be a data exchange path between the cell array Ca and all the neural cores when the first memory bank 2110a is implemented logically in the global memory type. The second path unit P2 may include the global controller 2200 of FIG. 14.

The second path unit P2 may form an Async-Path. The operating clock frequency of the second path unit P2 may be the same as the operating clock frequency of the global interconnection 5000. Likewise, the second path unit P2 may also operate at the same clock frequency as the operating clock frequency of the global interconnection 5000.

At this time, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be necessary. If the operating clock frequency of the bank controller Bc and the operating clock frequency of the second path unit P2 are not synchronized with each other, the degree of freedom in the design of the clock domain may be increased. Therefore, the difficulty of hardware design is decreased, thereby making it possible to more easily derive the hardware operation.

The bank controller Bc may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Bc does not necessarily have to be present for each memory bank. In other words, the bank controller Bc is not a part for scheduling but serves to transmit signals, and thus, is not an essential part for each memory bank having two ports. Therefore, one bank controller Bc can control multiple memory banks. The multiple memory banks may operate independently even if they are controlled by the bank controller Bc. However, the present embodiment is not limited thereto.

As a matter of course, the bank controller Bc may be present for each memory bank. In this case, the bank controller Bc may control each memory bank individually.

With reference to FIG. 22 and FIG. 23, if the first memory unit 210a exchanges data via the first path unit P1, the first address system may be used, and if the first memory unit 210a exchanges data via the second path unit P2, the second address system may be used. Likewise, if the second memory unit 210b exchanges data via the first path unit P1, a third address system may be used, and if the second memory unit 210b exchanges data via the second path unit P2, the second address system may be used. In this case, the first address system and the third address system may be the same as each other. However, the present embodiment is not limited thereto.

The first address system and the third address system may each be used exclusively for the first processing unit 100a and the second processing unit 100b, respectively. The second address system may be commonly applied to the first processing unit 100a and the second processing unit 100b.

In FIG. 23, the operating clock frequency of the second path unit P2 may operate at 1 GHz as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the contrary, the shared memory 2000 in accordance with some embodiments of the present inventive concept has room to use the first path unit P1 in addition to the second path unit P2, thereby making it possible to avoid delays resulting from the CDC operation.

Furthermore, in the generic global memory, a plurality of neural cores use one global interconnection 5000, and thus, when an amount of data transfer occurs at the same time, the decrease in the overall processing speed is likely to occur. On the contrary, the shared memory 2000 in accordance with some embodiments of the present inventive concept has room to use the first path unit P1 in addition to the second path unit P2, thereby making it possible to achieve the effect of properly distributing the data throughput that could be concentrated on the global controller 2200 as well.

FIG. 24 is a block diagram for illustrating a software hierarchy of a neural processing device in accordance with some embodiments of the present inventive concept.

With reference to FIG. 24, the software hierarchy of the neural processing device in accordance with some embodiments of the present inventive concept may include a DL framework 10000, a compiler stack 20000, and a back-end module 30000.

The DL framework 10000 may mean a framework for a deep learning model network used by a user. For example, a neural network that has finished training may be generated using programs such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. Moreover, the adaptation layer 21000 may convert the type of model into a required type.

The front-end compiler 23000 may convert various neural network models and graphs transferred from the adaptation layer 21000 into a certain intermediate representation IR. The converted IR may be a preset representation that is easy to handle later by the back-end compiler 24000.

The optimization that can be carried out in advance in the graph level may be performed on such an IR of the front-end compiler 23000. In addition, the front-end compiler 23000 may finally generate the IR via the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job in a scale that fits the details of hardware.

The compute library 22000 may store template operations designed in a form suitable for hardware among various operations. The compute library 22000 provides the back-end compiler 24000 with multiple template operations required by hardware, enabling the optimized code to be generated.

The runtime driver 25000 may continuously perform monitoring during driving, thereby making it possible to drive the neural network device in accordance with some embodiments of the present inventive concept. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated via the compiler stack 20000.

Figure 25:
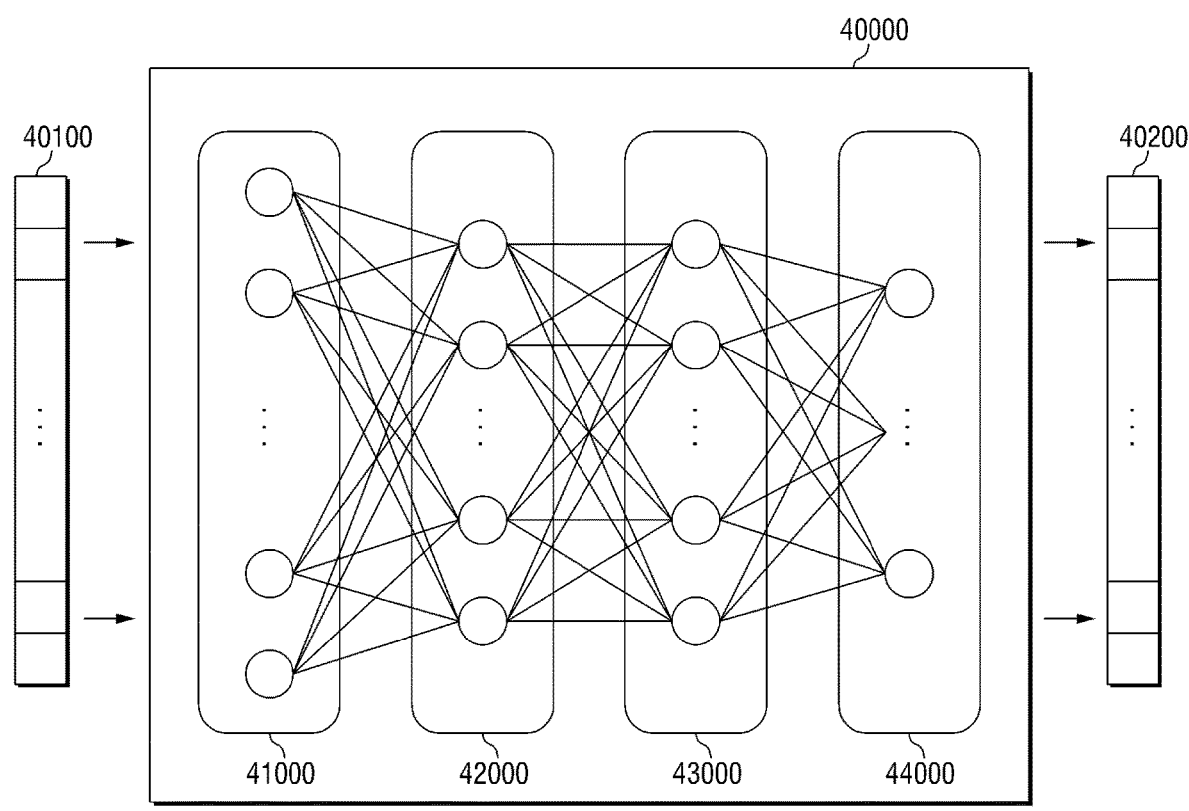
FIG. 25 is a conceptual diagram for illustrating deep learning calculations performed by the neural processing device of FIG. 1.

FIG. 25 is a conceptual diagram for illustrating deep learning calculations performed by a neural processing device in accordance with some embodiments of the present inventive concept.

With reference to FIG. 25, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output and an inferred output corresponding to a particular input by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments of the present inventive concept may implement the form of such an artificial neural network model 40000 and perform calculations. For example, the artificial neural network model 40000 may receive an input image, and may output information on at least a part of an object included in the input image.

The artificial neural network model 40000 is implemented by a multilayer perceptron (MLP) consisting of multilayer nodes and connections between them. An artificial neural network model 40000 in accordance with the present embodiment may be implemented using one of various artificial neural network model structures including the MLP. As shown in FIG. 15, the artificial neural network model 40000 consists of an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and transmit them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of teacher signals (correct answers), and an unsupervised learning method that does not require teacher signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 26:
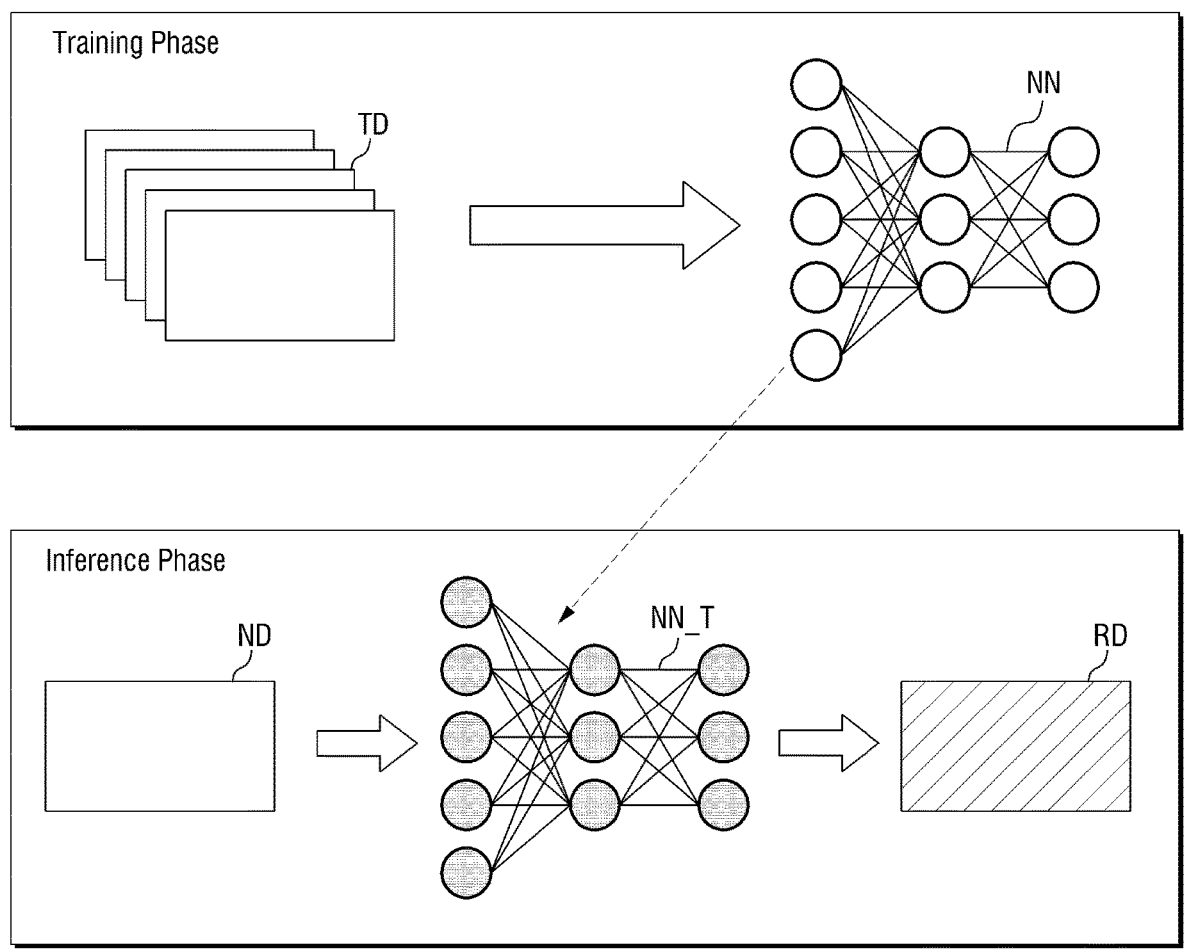
FIG. 26 is a conceptual diagram for illustrating training and inference operations of a neural network of the neural processing device of FIG. 1.

FIG. 26 is a conceptual diagram for illustrating training and inference operations of a neural network of a neural processing device in accordance with some embodiments of the present inventive concept.

Referring to FIG. 26, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, it may be important what training data TD were used in training and how many pieces of training data TD were used, in the training phase.

In the following, a method for calculating of a neural processing device in accordance with some embodiments of the present inventive concept will be described with reference to FIGS. 16, 19, and 27. The parts overlapping with the embodiments described above will be omitted or simplified.

Figure 27:
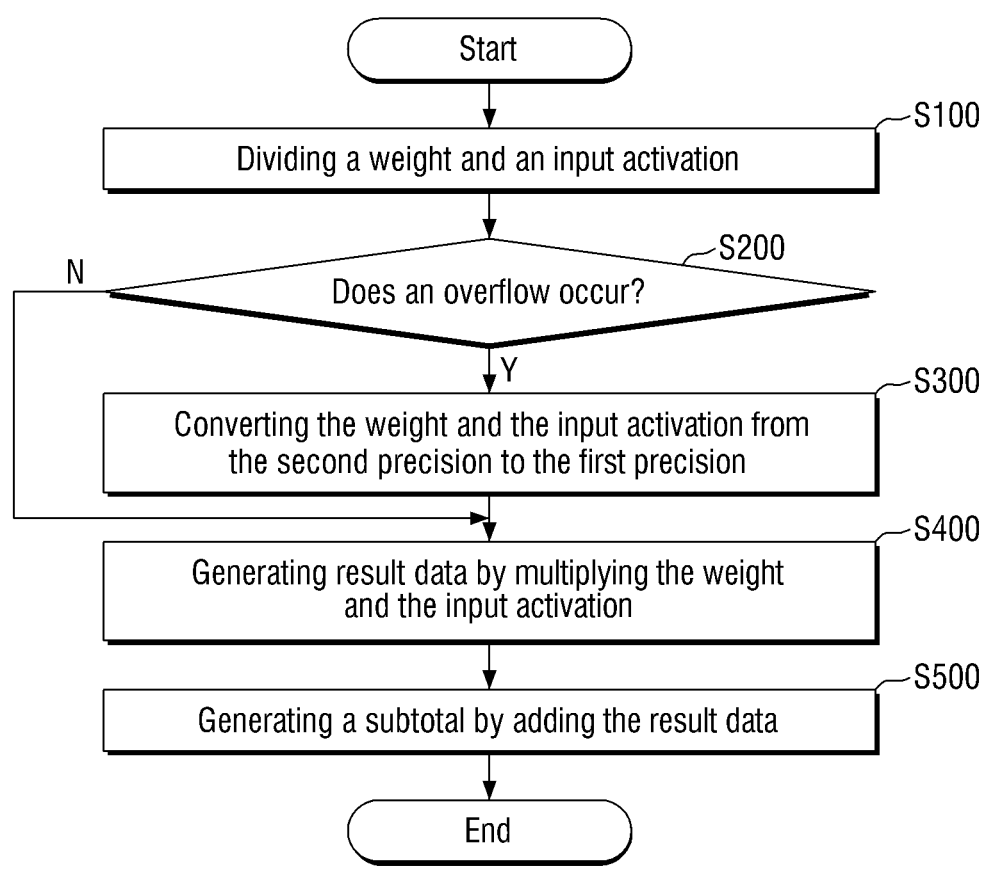
FIG. 27 is a flowchart for illustrating a method for calculating of a neural processing device in accordance with some embodiments of the present inventive concept.

FIG. 27 is a flowchart for illustrating a method for calculating of a neural processing device in accordance with some embodiments of the present inventive concept.

Referring to FIG. 27, a weight and an input activation are divided (S100).

Specifically, referring to FIG. 16, the bit divider Bd may receive the weight and the input activation Act_In. The bit divider Bd may divide the weight and the input activation Act_In into the number of bits of the second precision Pr2. Accordingly, the weight and the input activations Act_In may be plural and may each be data in the second precision Pr2.

Referring to FIG. 27 again, it is determined whether an overflow occurs (S200).

Specifically, referring to FIG. 16, the overflow detector Od may detect an overflow and an underflow. The overflow detector Od may determine whether calculation results of the respective multiplications of a plurality of weights Weight of the second precision Pr2 and a plurality of input activations Act_In of the second precision Pr2 will cause an overflow or underflow. Accordingly, the overflow detector Od may generate a detection result DR. The detection result DR may be a first result if an overflow or underflow occurs. The detection result DR may be a second result if an overflow and an underflow do not occur.

Referring to FIG. 27 again, if an overflow or underflow occurs, the weight and input activation are converted from the second precision to the first precision (S300).

Specifically, referring to FIG. 16, the overflow detector Od may convert the weight of the second precision Pr2 into the first precision Pr1. Further, the overflow detector Od may convert the input activation Actin of the second precision Pr2 into the first precision Pr1. The overflow detector Od may transmit the weight and the input activation Act_In directly to the demultiplexer Dx without transmitting them to the overflow detector Od.

Referring to FIG. 27 again, if an overflow and an underflow do not occur, result data are generated by multiplying the weight by the input activation (S400). Further, even when an overflow or underflow occurs, the result data are generated by multiplying the weight by the input activation after converting them into the first precision (S400).

Specifically, referring to FIGS. 13 to 15, if the mode signal Mode is the first mode signal for the first precision Pr1, multiplications may be performed in the first precision Pr1 regardless of whether an overflow or underflow occurs. If the mode signal Mode is the second mode signal for the second precision Pr2, multiplications may be performed in the second precision Pr2 if an overflow or underflow does not occur. In addition, if the mode signal Mode is the second mode signal for the second precision Pr2, multiplications may be performed in the first precision Pr1 if an overflow or underflow occurs.

In other words, the demultiplexer Dx may receive the weight and the input activation Act_In from the detection unit DU. The demultiplexer Dx may also receive the mode selection signal Ms. The demultiplexer Dx may transmit the weight and the input activation Act_In to either the first multiplier Mul1 or the second multiplier Mul2. The demultiplexer Dx may determine, by the mode selection signal Ms, a path through which the weight and the input activation Act_In are transmitted. In addition, the demultiplexer Dx may divide and transmit at least one weight and at least one input activation Act_In to a plurality of first multipliers Mul1 or a plurality of second multipliers Mul2.

The first multiplier Mul1 may calculate in the first precision. The second multiplier Mul2 may calculate in the second precision.

The multiplexer Mx may receive a calculation result, i.e., a result of a multiplication calculation, from either the first multiplier Mul1 or the second multiplier Mul2. The multiplexer Mx may receive results of multiplication calculations of input data of the first precision and input data of the first precision from the first multiplier Mul1, and may receive results of multiplication calculations of input data of the second precision and input data of the second precision from the second multiplier Mul2.

If the mode selection signal Ms is the first mode signal, the multiplexer Mx may receive k calculation results provided from the k first multiplexers Mx and generate result data. The result data may include a sign bit SB and a product bit PB. That is, the multiplexer Mx may generate one piece of result data by combining k calculation results.

If the mode selection signal Ms is the second mode signal, the multiplexer Mx may receive 2k calculation results provided from the 2k second multiplexers Mx and generate result data. The result data may include a sign bit SB and a product bit PB. That is, the multiplexer Mx may generate one piece of result data by combining 2k calculation results.

With reference to FIG. 27 again, a subtotal is generated by adding the result data (S500).

Specifically, referring to FIG. 10, the saturating adder SA may receive the result data. In other words, the saturating adder SA may receive the sign bit SB and the product bit PB. The saturating adder SA may receive the result data multiple times and accumulate them. Accordingly, the saturating adder SA may generate subtotals Psum. Such subtotals Psum may be outputted from each processing element 163_1 and finally summed up. However, the present embodiment is not limited thereto.

What is claimed is:

1. A processing element comprising:
a weight register configured to receive and store weights;
an input activation register configured to store input activations;
a flexible multiplier circuit configured to: receive the weight and the input activation, to perform a multiplication calculation in a first precision or a second precision different from the first precision according to a mode signal, occurrence of an overflow, and occurrence of an underflow, and to generate result data; and
a saturating adder configured to receive the result data and generate subtotals.

2. The processing element of claim 1, wherein the flexible multiplier circuit comprises:
a detection circuit configured to check whether an overflow or underflow occurs according to the multiplication calculation of the weight and the input activation and generate a detection result;
a mode select logic configured to generate a mode selection signal by taking the detection result and mode signal into account;
at least one first multiplier configured to perform multiplication calculations in the first precision;
at least one second multiplier configured to perform multiplication calculations in the second precision; and
a demultiplexer configured to receive the mode selection signal and select one of the at least one first multiplier and the at least one second multiplier to thereby transmit the weight and the input activation.

3. The processing element of claim 2, wherein a number of the at least one first multiplier is k, and
a number of the at least one second multiplier is 2k.

4. The processing element of claim 2, wherein the first precision is 2N bits, and the second precision is N bits.

5. The processing element of claim 4, wherein the first precision is INT4, and the second precision is INT2.

6. The processing element of claim 2, wherein the flexible multiplier circuit further comprises a multiplexer configured to receive a calculation result from the at least one first multiplier or the at least one second multiplier and generate a sign bit representing a sign and a product bit representing a magnitude.

7. The processing element of claim 6, wherein the result data comprise the sign bit and the product bit.

8. The processing element of claim 2, wherein the mode signal is one of a first mode signal for the first precision and a second mode signal for the second precision,
the detection result comprises a first result in which the overflow or the underflow occurs and a second result in which the overflow or the underflow does not occur, and
the mode selection signal is:
generated to be identical to the mode signal, if the mode selection logic receives the second result, and
generated as the first mode signal regardless of the mode signal, if the mode selection logic receives the first result.

9. The processing element of claim 8, wherein the detection circuit comprises:
a bit divider configured to divide the weight and the input activation into preset bit units;
an overflow detector configured to generate the detection result and output the weight and the input activation in the second precision if the detection result is the second result; and
a converting circuit configured to receive the weight and the input activation, to convert them into the first precisions, and to output them, when the detection result is the first result.

10. A neural processing device, comprising:
at least one neural core, comprising:
a processing unit configured to perform calculations; and
an L0 memory configured to store input and output data of the processing unit,
wherein the processing unit comprises a PE array, comprising:
at least one processing element; and
a flexible multiplier circuit configured to:
receive a weight and an input activation;
perform a multiplication calculation in a first precision or a second precision different from the first precision according to a mode signal, occurrence of an overflow, and occurrence of an underflow; and
generate result data; and
a saturating adder configured to receive the result data and generate subtotals.

11. The neural processing device of claim 10, wherein the weight and the input activation are represented in the second precision.

12. The neural processing device of claim 11, wherein the flexible multiplier circuit converts the weight and the input activation into the first precisions, respectively, if an overflow or underflow occurs when a result of the multiplication calculation of the weight and the input activation is represented in the second precision.

13. The neural processing device of claim 12, wherein the flexible multiplier circuit selects one of the first precision and the second precision according to the mode signal if the result of the multiplication calculation does not cause the overflow and the underflow, and performs a multiplication calculation.

14. The neural processing device of claim 10, further comprising:
- an L2 shared memory shared by the at least one neural core; and
- a local interconnection configured to transmit data between the L2 shared memory and the at least one neural core.

15. A method for calculating of a neural processing device including at least one processing element including precision conversion at the time of data calculation, comprising:
- determining, via a flexible multiplier circuit of the at least one processing element, whether a multiplication of a weight and an input activation causes an overflow or underflow, wherein the weight and the input activation are stored in a weight register and an input activation register, respectively;
- converting, via the flexible multiplier circuit, the weight and the input activation into a first precision when a mode signal selects the first precision;
- converting, via the flexible multiplier circuit, the weight and the input activation into the first precision when the overflow or the underflow occurs;
- maintaining, via the flexible multiplier circuit, the weight and the input activation in a second precision when the mode signal selects the second precision and the overflow or the underflow does not occur;
- generating, via the flexible multiplier circuit, result data by multiplying the weight and the input activation; and
- generating, via a saturating adder, a subtotal by accumulating the result data.

16. The method for calculating of the neural processing device of claim 15, wherein the first precision uses twice as many bits as the second precision.

17. The method for calculating of the neural processing device of claim 16,
- wherein the second precision is represented by symmetric quantization or asymmetric quantization,
- wherein the symmetric quantization and the asymmetric quantization use at least one symbol, respectively, and each of the at least one symbol has a range of numbers.

18. The method for calculating of the neural processing device of claim 17, wherein the second precision comprises a first bit representing a sign and a second bit representing a magnitude.

19. The method for calculating of the neural processing device of claim 15, further comprising:
- the at least one processing element dividing the weight and the input activation before determining whether the overflow or the underflow occurs.

20. The method for calculating of the neural processing device of claim 15, wherein the generating result data comprises:
- the at least one processing element generating the result data by selecting one of a first multiplier corresponding to the first precision and a second multiplier corresponding to the second precision.

* * * * *